United States Patent
Tavildar et al.

(10) Patent No.: US 9,258,692 B2
(45) Date of Patent: Feb. 9, 2016

(54) RELAY ASSISTED PEER DISCOVERY

(75) Inventors: Saurabha Rangrao Tavildar, Jersey City, NJ (US); Shailesh Patil, Bridgewater, CA (US); Hua Wang, Basking Ridge, NJ (US); Aleksandar Jovicic, Jersey City, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 547 days.

(21) Appl. No.: 13/544,868

(22) Filed: Jul. 9, 2012

(65) Prior Publication Data

US 2014/0010108 A1 Jan. 9, 2014

Related U.S. Application Data

(63) Continuation-in-part of application No. 13/436,140, filed on Mar. 30, 2012, now Pat. No. 9,042,550.

(51) Int. Cl.
*H04W 4/00* (2009.01)
*H04W 8/00* (2009.01)
*H04W 12/02* (2009.01)
*H04L 29/06* (2006.01)
*H04W 84/04* (2009.01)

(52) U.S. Cl.
CPC ............ *H04W 8/005* (2013.01); *H04L 63/0478* (2013.01); *H04W 12/02* (2013.01); *H04W 84/047* (2013.01)

(58) Field of Classification Search
CPC ... H04W 8/005; H04W 12/02; H04W 84/047; H04W 63/0478
See application file for complete search history.

(56) References Cited

U.S. PATENT DOCUMENTS

| | | | |
|---|---|---|---|
| 6,850,734 B1 | 2/2005 | Bruno et al. | |
| 7,908,389 B2 * | 3/2011 | Zuckerman | G06F 17/30206 709/231 |
| 2005/0237956 A1 | 10/2005 | Kuperschmidt et al. | |
| 2007/0226362 A1 | 9/2007 | Johnson et al. | |
| 2008/0037487 A1 * | 2/2008 | Li | H04W 40/244 370/338 |
| 2009/0016255 A1 | 1/2009 | Park | |
| 2009/0016353 A1 * | 1/2009 | Li | H04W 8/005 370/395.3 |
| 2009/0323647 A1 | 12/2009 | Park et al. | |
| 2009/0327395 A1 | 12/2009 | Park et al. | |
| 2010/0150048 A1 * | 6/2010 | Tsai et al. | 370/312 |
| 2010/0254308 A1 | 10/2010 | Laroia et al. | |

(Continued)

FOREIGN PATENT DOCUMENTS

| | | |
|---|---|---|
| WO | WO-2008004102 A2 | 1/2008 |
| WO | WO-2009158652 A1 | 12/2009 |
| WO | WO-2013149060 A1 | 10/2013 |

OTHER PUBLICATIONS

International Search Report and Written Opinion—PCT/US2013/049336—ISA/EPO—Jun. 13, 2014.

*Primary Examiner* — Ajay Cattungal
(74) *Attorney, Agent, or Firm* — James K. O'Hare

(57) ABSTRACT

Techniques for enabling relay assisted peer discovery in a wireless communication network are disclosed. A relay may receive, from at least one user equipment (UE), at least one hashed expression to transmit. Further, a relay may compute a time dependent hash of the at least one hashed expression to transmit. The relay may broadcast, and the second UEs may receive, the time dependent hash of the at least one hashed expression. The UE may be, for example, an eNodeB. The hashed expression may be a time varied hashed expression.

34 Claims, 14 Drawing Sheets

(56) References Cited

U.S. PATENT DOCUMENTS

| | | |
|---|---|---|
| 2010/0272029 A1 | 10/2010 | Laroia et al. |
| 2010/0272081 A1 | 10/2010 | Laroia et al. |
| 2011/0039592 A1 | 2/2011 | Haddad et al. |
| 2011/0128972 A1 | 6/2011 | Thornton et al. |
| 2012/0207297 A1* | 8/2012 | Tian ............ H04L 63/062 379/211.02 |
| 2013/0259231 A1* | 10/2013 | Wang ............ H04W 8/005 380/270 |

* cited by examiner

RELAY ASSISTED PEER DISCOVERY

RELATED APPLICATIONS

The present application is a continuation-in-part of U.S. patent application Ser. No. 13/436,140, filed Mar. 30, 2012.

BACKGROUND

I. Field

The present disclosure relates generally to communication, and more specifically to techniques for supporting peer-to-peer (P2P) communication.

II. Background

Wireless communication networks are widely deployed to provide various communication content, such as voice, video, packet data, messaging, broadcast, etc. These wireless networks may be multiple-access networks configured to support multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. A wireless communication network may also be referred to as a wide area network (WAN).

A wireless communication network may include a number of base stations (also referred to as evolved node Bs, eNodeBs, or eNBs) that can support communication for a number of user equipments (UEs). In a WAN, communication by UEs typically occurs via uplink/downlink channels between the UEs and a base station. A UE is thus enabled to communicate with a base station.

However, if two UEs are in the vicinity of each other, they may be enabled to communicate directly, that is, without communicating through the base station. A UE may thus be enabled to communicate peer-to-peer (P2P), also referred to as device-to-device (D2D), with one or more other UEs.

It may be desirable to efficiently support P2P communication for UEs, such as to enable new types of services, to improve available services, such by eliminating interference, and/or to reduce the traffic load on base stations.

SUMMARY

The present disclosure provides techniques for performing relay assisted peer discovery.

In an embodiment, apparatus, computer programs, methods and systems for enabling relay assisted peer discovery in a wireless communication network are provided. In such an embodiment, a relay may receive, from at least one user equipment (UE), at least one hashed expression to transmit. Further, a relay may compute a time dependent hash of the at least one hashed expression to transmit. The relay may broadcast the time dependent hash of the at least one hashed expression. The UE may be, for example, an eNodeB. The hashed expression may be a time varied hashed expression.

In another embodiment, apparatus, computer programs, methods, and systems for improving peer-to-peer communication in a wireless communication network are provided. In such an embodiment, in response to generating a plurality of expressions to be transmitted during a future time period, a UE may aggregate the plurality of expressions into at least one packet. Further, prior to the commencement of the future time period, the UE may transmit the aggregated expressions to at least one of a plurality of relays configured to broadcast the aggregated expressions during the future time period.

In still another embodiment, apparatus, computer programs, methods and systems for operating a user equipment (UE) in a relay assisted peer discovery are provided. In such an embodiment, the UE may transmit its hashed expression, at a first time, at least to at least one relay associated with the UE for time varied hashing of, and broadcast of, the hashed expression by the at least one relay. Further, the UE may receive, at least from the at least one relay, a plurality of second time varied hashed peer discovery expressions received from a plurality of second UEs. Yet further, the UE may decrypt the received second time varied hashed expressions to discern identities of ones of the plurality of second UEs. The decryption may include the UE applying a hash public key.

In yet a further embodiment, additional apparatus, computer programs, methods and systems for operating a user equipment (UE) in a relay assisted peer discovery are provided. In such an embodiment, the UE may transmit its hashed expression, at a first time, at least to at least one relay associated with the UE for time varied hashing of, and broadcast of, the hashed expression by the relay. Additionally, the UE may receive and decrypt, at least from the at least one relay, a plurality of time varied hashed peer discovery expressions received from a plurality of second UEs.

Various and additional aspects and features of the disclosure are described in further detail below.

DETAILED DESCRIPTION

The figures and descriptions of the disclosure have been simplified to illustrate elements that are relevant for clear understanding, while eliminating, for the purposes of clarity and brevity, other elements found in typical telecommunications apparatuses, systems and methods. Those of ordinary skill in the art will thus recognize the other elements and/or steps that are desirable and/or required in implementing the disclosure. However, because such elements and steps are well known in the art, and because they do not facilitate a better understanding of the present invention, a discussion of such elements and steps is not provided herein. The disclosure herein is nevertheless directed to all variations and modifications to the disclosed elements and steps that will be known or apparent to those skilled in the art in light of this disclosure.

The techniques described herein may be used for various wireless communication networks, such as CDMA, TDMA, FDMA, OFDMA, SC-FDMA, and other wireless networks. The terms "network" and "system" are often used interchangeably herein. By way of example, a CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology, such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both Frequency Division Duplex (FDD) and Time Division Duplex (TDD), are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above, as well as for other wireless networks and radio technologies.

Figure 1:
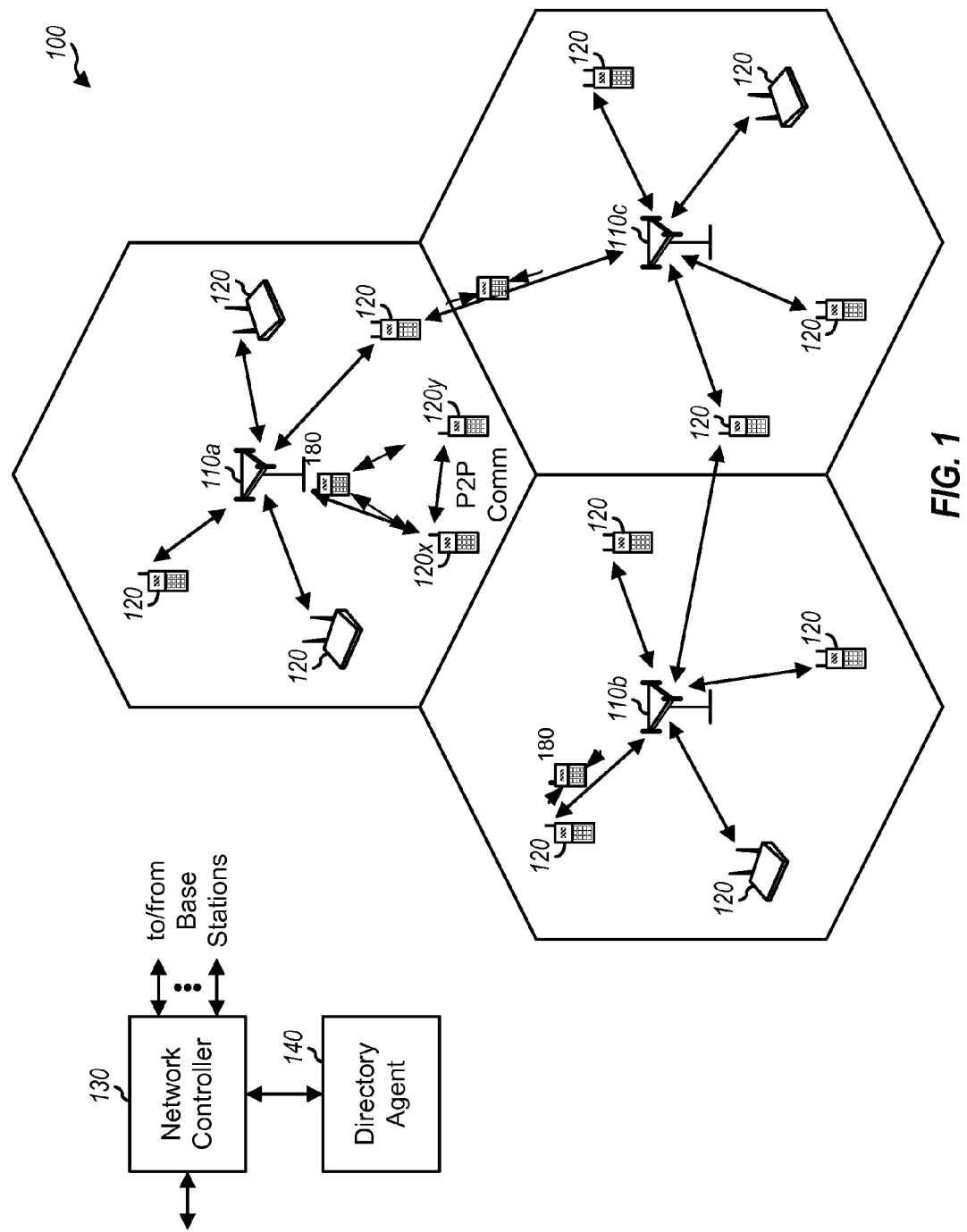
FIG. 1 shows a wireless communication network, which may be a LTE network or other wireless network.

FIG. 1 shows a wireless communication network 100, which may be a LTE network or other wireless network (also referred to herein as a wide area network, or WAN, or simply as a network). Wireless network 100 may include a number of base stations and other network entities. For simplicity, only three base stations 110a, 110b, and 110c, one network controller 130, and a directory agent 140 are shown in FIG. 1. A base station may be an entity that communicates with the devices and may also be referred to as a Node B, an evolved Node B (eNB), an access point, etc. Each base station 110 may provide communication coverage for a particular geographic area, and may support communication for the devices located within the coverage area. To improve network capacity, the overall coverage area of a base station may be partitioned into multiple (e.g., three) smaller areas. Each smaller area may be served by a respective base station subsystem. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

WAN 100 may be a heterogeneous network (HetNet) that includes base stations of different types, e.g., macro base stations, pico base stations, home base stations, relays (as discussed below), etc. For example, a base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, WAN 100 includes macro base stations 110a, 110b, and 110c for correspondent macro cells. WAN 100 may also include pico base stations for pico cells, and/or home base stations for femto cells (not shown in FIG. 1).

Network controller 130 may couple to one or more base stations, and may provide coordination and control for these base stations. Network controller 130 may be a single network entity or a collection of network entities. Network controller 130 may communicate with the base stations via a backhaul. The base stations may also communicate with one another, e.g., directly or indirectly via wireless or wireline backhaul. Directory agent 140 may be a separate network entity and may be coupled to network controller 130 (as shown in FIG. 1) and/or to other network entities. Directory agent 140 may also be part of a base station 110, or network controller 130, or some other network entity (not shown in FIG. 1). Directory agent 140 may support peer discovery by devices, such as by providing certain identifying information of user devices, as described further below. Directory agent 140 may also be referred to by other names.

Devices 120 may be dispersed throughout the wireless network, and each device may be stationary or mobile. A device may also be referred to as a user equipment (UE), a user device, a mobile station, a terminal, an access terminal, a subscriber unit, a station, etc. A device may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, a peripheral device (e.g., a printer), etc. A device may communicate with a base station in a wireless network. A device may also communicate peer-to-peer (P2P) with other devices. In the example shown in FIG. 1, devices 120x and 120y may communicate peer-to-peer, and remaining devices 120 may communicate with base stations. Devices 120x and 120y may also be configured to communicate with base stations, e.g., when not engaged in P2P communication or possibly concurrent with P2P communication. P2P communication may be used to offload data traffic in order to reduce congestion on a radio interface as well as a core network.

WAN 100 may also include relays 180. A relay 180 may be any entity that receives a transmission of data from an upstream entity (e.g., a base station or a UE) and sends a transmission of the data to a downstream entity (e.g., a UE or a base station), i.e., that relays data without modification. A relay may be a UE that relays transmissions for other UEs, a base station that relays transmissions, or any other independent relay device or node. Those skilled in the art will appreciate that relays may be included throughout the networks, cells, and systems herein described.

In the description herein, WAN communication refers to communication between a UE and a base station, such as for a call between the UE and a remote entity, such as another UE, via the base station. A WAN link, and variants thereof, as used herein, thus refers to a communication link between a UE and a base station. In contrast, a P2P communication, as used herein, refers to direct communication between two or more UEs, wherein the direct communication typically occurs without going through a base station. A P2P link, or variants thereof, thus refers to a typically direct communication link between two or more UEs engaged in P2P communication. Correspondingly, a WAN UE is a UE that is interested or engaged in WAN communication, and a P2P UE is a UE that is interested or engaged in P2P communication.

A P2P group refers to a group of two or more UEs engaged in P2P communication. In one design, one UE in the P2P group may be designated as a P2P server (or a P2P group owner), and each remaining UE in the P2P group may be designated as a P2P client. The P2P server may perform certain management functions, such as exchanging signaling with a WAN, coordinating data transmission between the P2P server and the P2P client(s), and the like.

P2P communication typically includes the discovery/detection of peer devices of interest within a particular range, e.g., within radio frequency (RF) range. Devices that can and/or desire to communicate P2P may perform peer discovery autonomously. For autonomous peer discovery, a device may occasionally (e.g., periodically) transmit a proximity detection signal (PDS) to announce its presence, and to enable other devices to detect the device. Alternatively or additionally, the device may detect other devices near its proximity based on proximity detection signals transmitted by these other devices. A proximity detection signal may also be referred to as a peer detection signal, a peer discovery signal, etc. A proximity detection signal may comprise a pilot, and may carry identification information for a transmitter of the proximity detection signal and/or other information. A pilot is a signal that is known a priori by a transmitter and a receiver, and may also be referred to as a reference signal, a preamble, etc.

In an aspect, secure, relay-assisted peer discovery may be used to aid devices in performing peer discovery. The disclosure thus relates to a base station, UE, or any other relay or like network device, for securely assisting one or more P2P devices in a cellular system in discovering peer devices. More particularly, a UE may use the relay for broadcasting an encrypted discovery expression, and, in some embodiments, the receiving relay may not recognize the non-encrypted actual expression, nor may the receiving relay be capable in such embodiments of identifying a particular UE, or its actual expression, based on the encrypted discovery expression broadcast by the receiving relay. That is, the disclosure may allow the UE to announce a private expression.

Figure 2:
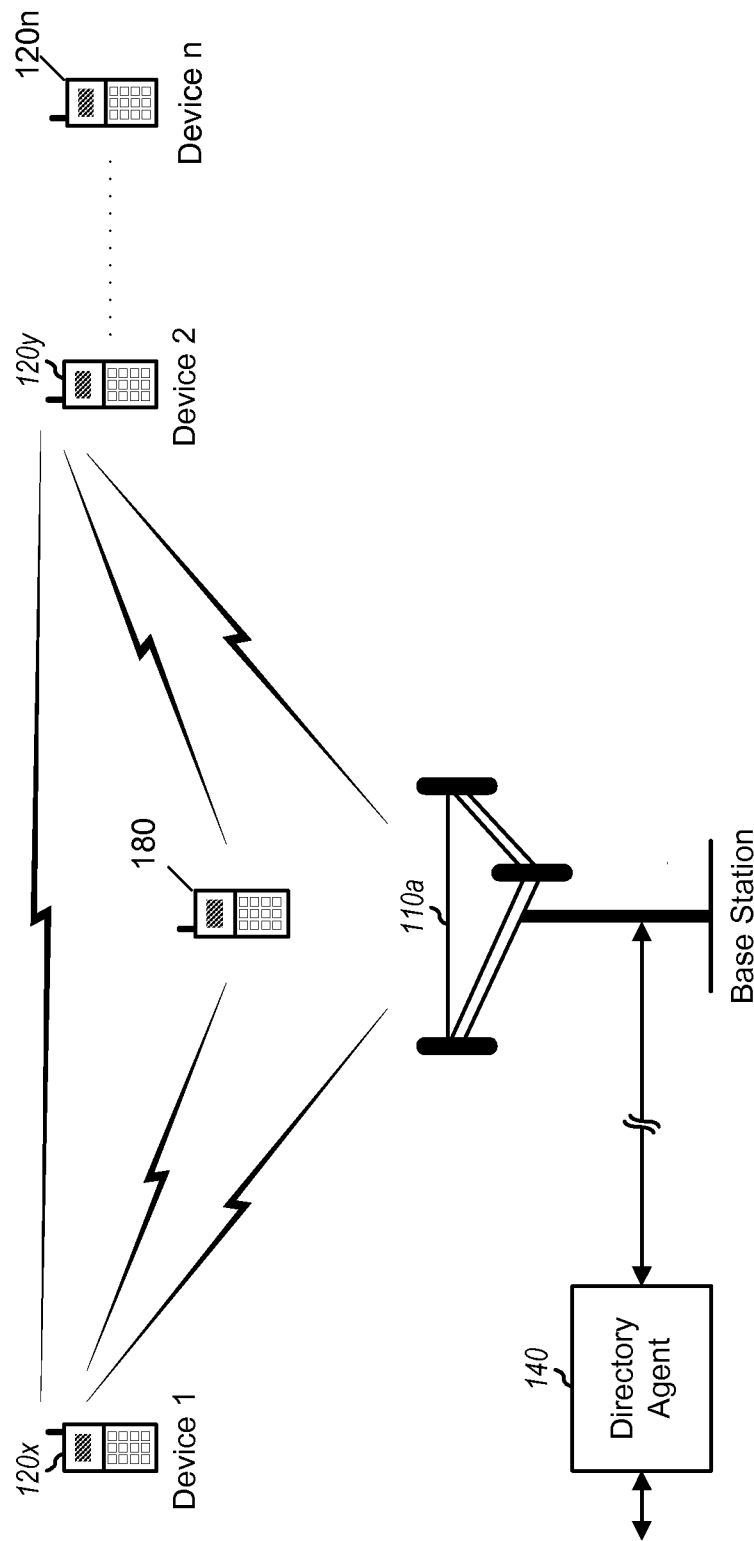
FIG. 2 shows communication between two devices and a directory agent via a relay in an embodiment.

FIG. 2 shows communication between two devices 120x and 120y and directory agent 140 via relay 180 for relay-assisted peer discovery. Devices 120x and 120y may communicate with directory agent 140 via base station 110a, via relay 180, or via different base stations. In additional embodiments, base station 110a may perform the functions described herein of relay 180, and vice versa. Devices 120x and 120y may also communicate with base station 110a for WAN communication and also for scheduling of P2P communication. Devices 120x and 120y may transmit and receive proximity detection signals for peer discovery and may also communication peer-to-peer. Base station 110a may be a serving base station of device 120x and/or 120y. Directory agent 140 may assist devices 120x and 120y with peer discovery.

Those skilled in the art will appreciate that there may be many UEs 120x, 120y ... 120n operating within network 100. In many applications, such as, for example, social networking applications, UE 120x may wish to discover other UEs, such as UE 120y, proximate to UE 120x. To that end, UE 120x may broadcast a peer discovery signal that conveys an expression that can provide a secure identification, and/or UE 120x may register with one or more components (such as relays 180 and/or a base station 110) of network 100.

In the latter design, herein referred to as "registration" (and variants thereof), the UE may register with a non-peer network component. In this case, UE 120x may register itself with directory agent 140 (or some other designated network entity). For example, device 120x may register with directory agent 140 upon entering WAN coverage, e.g., upon detecting a macro cell in wireless network 100. Device 120x may also register with directory agent 140 to request one or more services, to advertise one or more services, to query for peer devices near the vicinity of device 120x, etc. Directory agent 140 may or may not be part of wireless network 100.

Device 120x may provide pertinent information to directory agent 140 as part of registration. In one design, device 120x may provide identification information identifying device 120x, service information identity of one or more services offered and/or requested by device 120x, location information for device 120x, etc. The identification information may comprise a device identity (ID), or "expression," unique to device 120x. The expression may have a suitable length (e.g., 12 bits or some other number of bits) to ensure uniqueness with sufficiently high probability. The service information may include one or more service IDs for one or more services offered by device 120x and/or one or more services requested by device 120x. A number of services may be defined/supported, and each service may be assigned a different service ID to identify that service. A group of related services may also be defined and assigned a service ID. A service ID may be a string or an index of a suitable length (e.g., 12 bits or some other number of bits) that can uniquely identify a service, a group of services, or all services. The location information may provide at least an approximate geographical location of device 120x. For example, the location information may provide a tracking area of device 120x or the location of a serving base station of device 120x as a coarse location of device 120x. The location information may also provide an accurate location estimate for device 120x, which may be obtained based on a Global Navigation Satellite System (GNSS) such as Global Positioning System (GPS).

Device 120x may thus perform the registration to advertise its services and/or to obtain services, such as the social networking services mentioned above. In addition to, or in the alternative to, the foregoing registration, peer UEs 120x and 120y may engage in the synchronized P2P discovery referenced above, and referred to herein generally as "peer discovery" (or variants thereof). In peer discovery, peers may communicate directly, such as using an assigned peer discovery resource (e.g., a designated resource block or blocks, or a portion of a resource block or blocks, of an LTE subframe), to discover one another. Peer discovery may occur with, or without, aid of information at directory agent 140.

Figure 3:
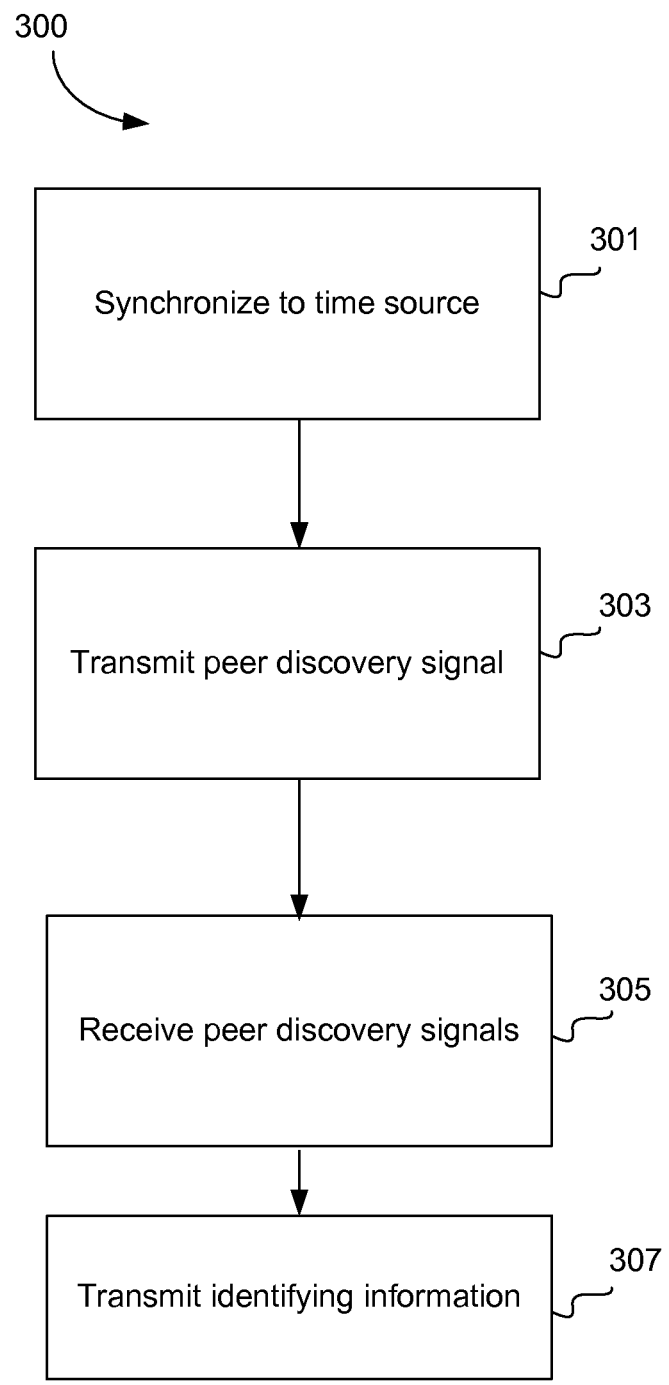
FIG. 3 illustrates the exemplary transmission of peer discovery signals by user equipments (UEs) available to communicate P2P in a network in an embodiment.

By way of example, and as illustrated in method 300 of FIG. 3, the UEs available to communicate P2P in network 100 may synchronize to an external time source (e.g., CDMA 2000, GPS, etc.) at optional step 301, and may periodically (on a period synchronized to the external time source) transmit a peer discovery signal to allow for peer discovery at step 303. Correspondingly, the UEs (such as UE 120x) may periodically listen to/receive peer discovery signals in order to detect proximate entities of interest at step 305. For example, direct signaling that partitions a time-frequency resource into a number of segments may be utilized to communicate, or transmit, an identifier, or expression, within an assigned peer discovery interval, and to detect, or receive, peer discovery signals, or expressions, from local peers during that peer discovery interval. In some designs, peer discovery signaling may be effectuated over a plurality of peer discovery intervals, such that partial identifiers communicated during each of the peer discovery intervals may be linked. For example, the sending of and listening for peer discovery signals may occupy an assigned peer discovery resource that is divided into a certain number of segments, such as 5600 segments, and that repeats over a given timeframe, such as every 8 seconds.

Upon detection of peers in network 100 through peer discovery at step 305, UE 120x may wish to use peer discovery to directly advertise information to its peers in the local vicinity. That is, UE 120x may wish to transmit identifying information, such as presence information, identification information, location information, and service information, such as service requests, service offers, etc., such as to allow those other devices to discover that information and take subsequent action in a manner akin to, or in supplementation to, the aforementioned registration (such as in a WAN embodiment), at step 307.

By way of non-limiting example of peer discovery, UE 120x may send a request, or expression, indicating one or more services offered by UE 120x, and/or one or more services requested by device 120x, such as that UE 120x is running a particular gaming application and is requesting P2P partners for the game. Further, an updated request, or expression, may be sent due to various reasons, such as due to a change in the game status of UE 120x, a change in the operating status of UE 120x, a change in the geographical location of UE 120x, a change in the battery status of UE 120x, etc.

However, as a precursor to the other devices taking action on the actionable information, i.e., the service information (the gaming information in the prior example), those other devices may need to discover the identifying information, or the expression, of UE 120x. This discovery of identifying information (and, in embodiments, of service information as well) may be based on the unique expression of UE 120x on the peer discovery resource. The discovery of this expression may allow, for example, for a P2P connection between the other device(s) and UE 120x.

It is typically preferred that the peer discovery information be communicated in a reliable and secure manner, such as to protect from malicious nodes spoofing the information. In such cases, there is a need to allow devices to confirm the identity of the corresponding sending/receiving device or node (UE 120x in the foregoing example), such as to insure that UE 120x had control over or authorized the communication of the communicated expression.

Thus, all UEs 120x, 120y . . . 120n that support P2P communications may implement cryptography, or other security and data reliability technique, for peer discovery. That is, UE 120x may generate its expression using a cryptographic key, such as a private key, in conjunction with its expression data, and may then transmit the generated modified expression during the peer discovery interval. Correspondingly, UEs in network 100 may monitor for these modified expressions of other UEs during the peer discovery interval.

More particularly, UE 120y may monitor the peer discovery resource for incoming signals, may receive the transmitted modified expression, and may desire to verify ownership of the detected expression. Accordingly, UE 120y may receive a signed communication generated using a private key known to UE 120x. UE 120y may determine if UE 120x owns the expression by determining (such as by responding to UE 120x using the public key and awaiting confirmation that UE 120x received the response) if the received modified expression was generated using a first public key, which first public key must be confirmed as corresponded to the private key.

This well known encryption technique is referred to as public/private key cryptography, or public/private key encryption. In particular embodiments of public/private key encryption, only a recipient having a private key can decrypt a message encrypted using a corresponding public key. However, advanced public/private key encryption typically takes significant processing resources and overhead, particularly in view of the more limited needs for security for the small number of data bits used in identifying expressions for peer discovery.

Secure hashing, or simply "hashing" (and variants thereof), in cryptographic terms, includes converting first information into new information in a manner that cannot be directly reversed, or "directly decrypted." Hashing thus need not employ the processing and overhead typically needed in an extensive public/private key design. In short, in order to verify that an original expression corresponds to a hashed expression, initial expressions may be iteratively hashed, and/or a known expression or hashed expression may be iteratively compared to a received expression or hashed expression until a match is found, thus indicating, such as via confirmed responsive communications, that the underlying expression of the received expression or hashed expression identifies a known UE.

Figure 4:
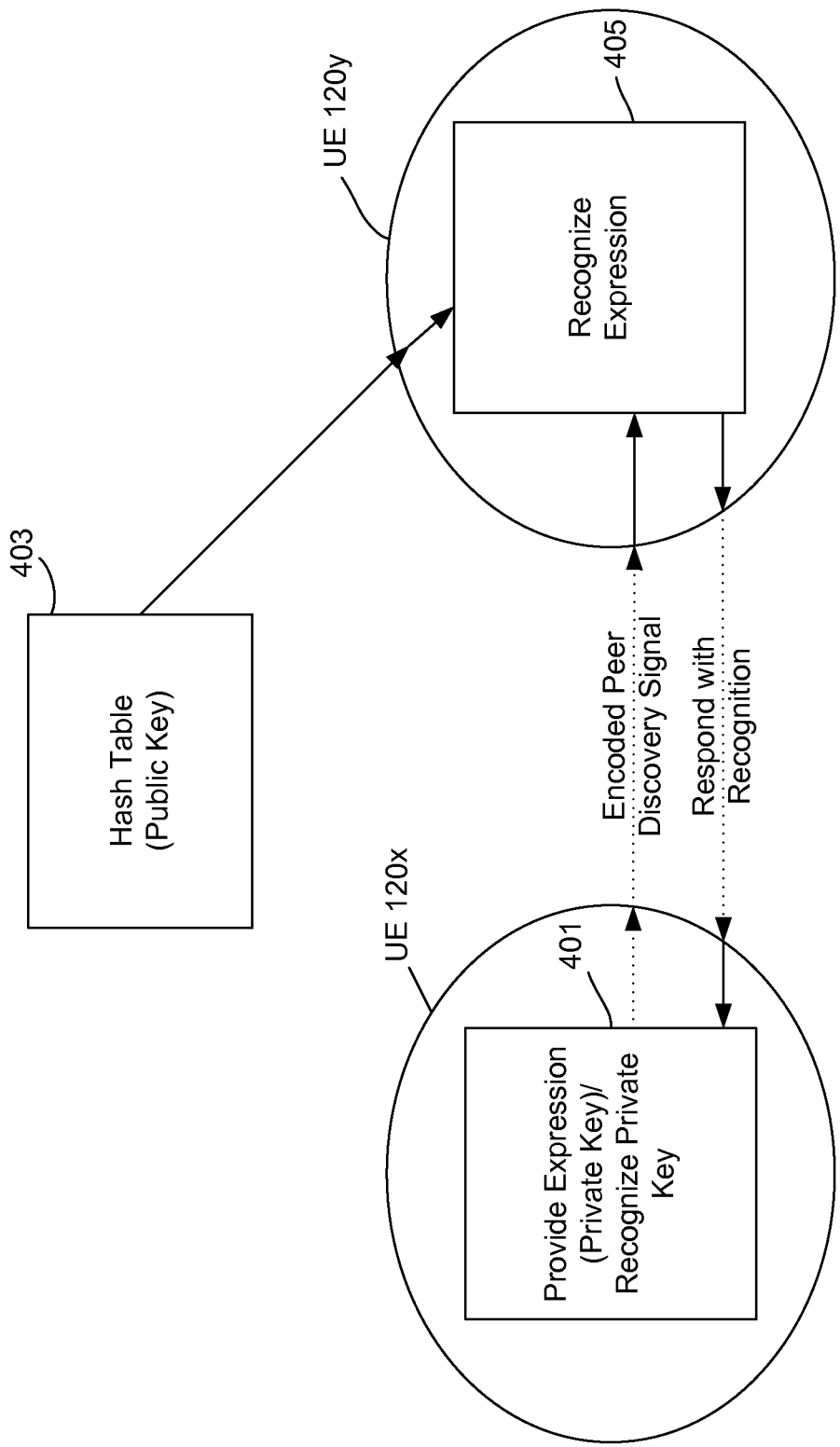
FIG. 4 shows a manner of "hashing" the expression of a UE in an embodiment.

As such, hashing may provide a simplified public/private key design. For example, and as illustrated in the block diagram of FIG. 4, UE 120x may have/provide/announce an expression, which may be hashed with, or into, a secure hash function, thus forming a "hash private key," at block 401. A hash table of hash functions that may be applied to the hashed expression is available to all, or a subset, of UEs at block 403. The hash table thus provides a "hash public key." As such, the hash table may allow for the underlying expression that has been hashed to be known, or recognized, by a UE 120y at block 405, such as may be confirmed by an acknowledged response to the UE holding the private key in accordance with the public key. That is, the hash public key (or simply "public key") may allow the identity of a sending UE to be known from the hash private key (or simply "private key"), i.e., from the hash of the underlying expression (in the manner of public/private key encryption).

Yet more particularly, hashing may thus provide a decentralized, distributed cryptographic system that provides a public key type lookup service. Public keys may be stored in a hash table, and any authorized, trusted, participating UE can efficiently retrieve an expression that has been associated with a given key. Further, because responsibility for mapping from keys to expressions is distributed across UEs performing peer discovery, hashing is scalable for continuous arrivals, departures, and failures. Those skilled in the art will appreciate that the foregoing discussion of hashing has been greatly simplified, and is provided solely as an overview in relation to the present disclosure.

An expression of UE 120x may be thus hashed for security and reliability, and this hashed expression may convey, for example, information including one of: device identification information, user identification information, a service advertisement, a service request, a merchandise advertisement, a merchandise request, an offer, group identification information, location information, device capability information, or other information that may be of interest to other peer to peer devices. In certain embodiments particularly related to the instant disclosure, the cryptographic function to provide the hash may additionally be, for example, subjected to a time varying function, thus forming, upon the cryptographic hashing, a time varied hashed expression (also referred to herein as a time dependent hashed expression, and other variants thereof).

In an exemplary embodiment of a time varied hashed expression, a time varying hash of the expression (e) of UE 120*x* may be generated as a hash function h(e,t) at each time (t). Accordingly, any trusted device that knows expression (e) may find a match between (e) and the received bits by computing h(e,t) at the time (t). For any non-trusted device that is not trusted with expression (e), the received bits will look random, even if the non-trusted device is in possession of the hash function (h). Thereby, secure peer discovery may be substantially accomplished.

The time varying hash is thus employed to further ensure that a device that is not trusted cannot spoof or track the device having expression (e). More particularly, if the UE simply transmitted a hashed expression, h(e), then although an unauthorized device could not readily determine expression (e), the unauthorized device could still track or spoof h(e). Having a time varying hash, h(e,t), appreciably decreases the probability that the unauthorized device could track or spoof h(e).

Thus, in one design, UE 120*x* may transmit, i.e., may broadcast, its peer discovery signal, which may be a time varying hash, $h_{120x}(e_1,t)$, and may endeavor to detect the peer discovery signal(s) of other UEs 120*y* . . . 120*n*, which may also be time varying hashes, $h_{120n}(e_n,t)$. However, due to the rate of decay of radio signals, UE 120*x* may be unable to directly detect the peer discovery signal of its peer UEs, and may itself be undetectable to certain of its peer UEs. Further, the peer UEs may operate in a different frequency band or with a different operator than UE 120*x*, thus further decreasing the likelihood that UE 120*x* will "see" its peer UEs, or vice versa. This may particularly occur in the case of different frequency bands or operators, at least because it may not be feasible for UE 120*x* to transmit and receive peer discovery signals across all possible bands, due in part to power consumption, processing capability, and overhead concerns.

However, relays 180 may serve to overcome certain of these peer discovery difficulties. For example, relays 180 may receive communicatively associated peer UEs' peer discovery signals (such as to cure radio decay), may exchange this information with other relays (such as to cure different frequency band or operator issues), and may broadcast/rebroadcast peer discovery signals so that peer UEs in a broader operating range, type, and distance can discover one other.

Figure 5:
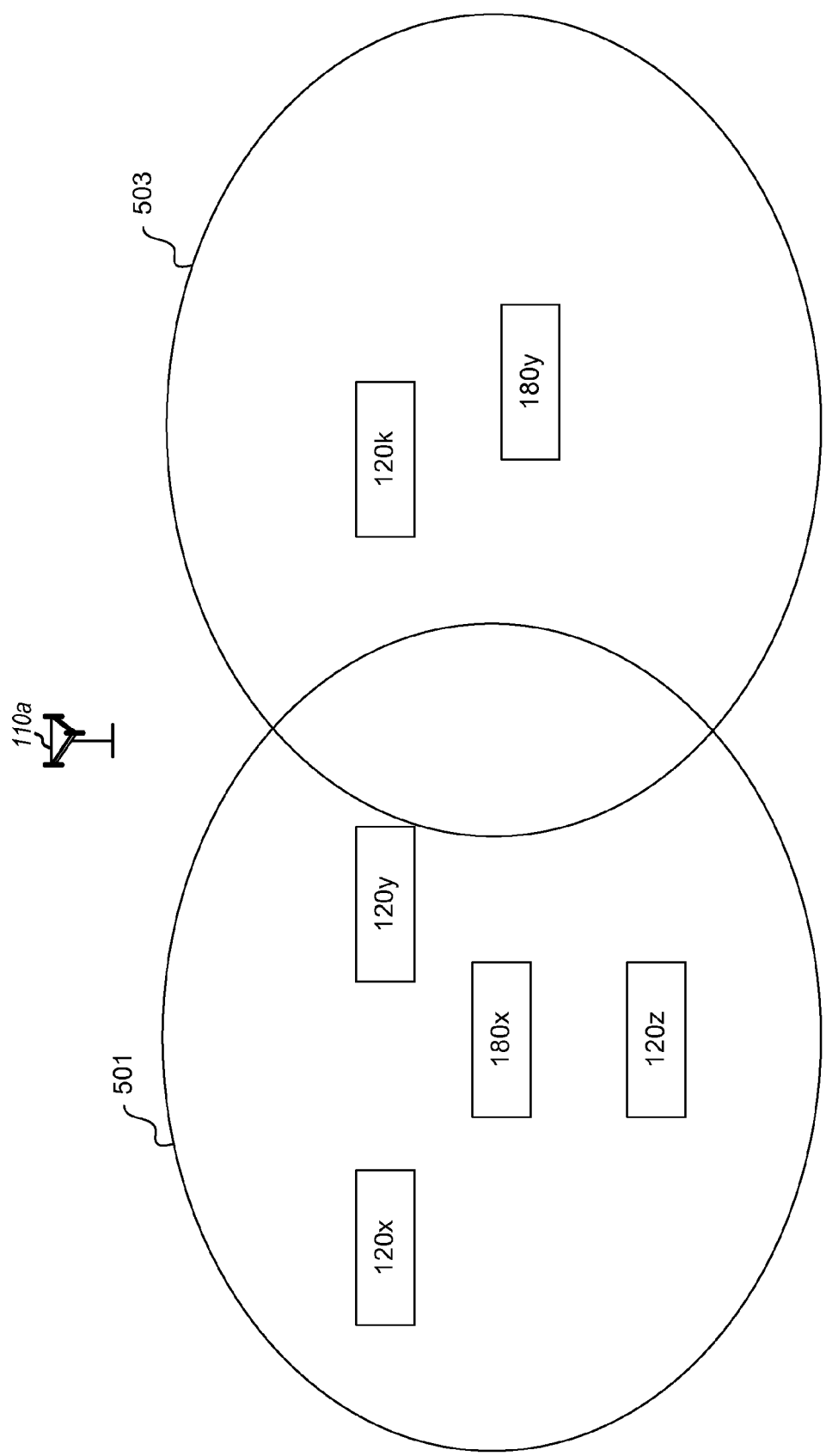
FIG. 5 illustrates two areas served by a base station, and respectively served by relays, in an embodiment.

FIG. 5 illustrates two areas (or subsystems as referenced above with respect to FIG. 1), areas 501 and 503, both served by base station 110*a*, and each respectively also served by relays 180*x* and 180*y*. In the illustration, UEs 120*x*, 120*y*, and 120*z* reside in area 501, and UE 120*k* resides in area 502.

Peer discovery information (which, at least in part, forms the expression, (e)) is usually constituted by a very small amount of data and, although the peer discovery information may be fixed over a long time period, the bits that protect, or encode, this peer discovery information in the peer discovery signal may cause the peer discovery signal to change rapidly due to data security concerns. Thus, although expressions are typically short, the repeated and periodic transmission of encoded peer discovery signals by UEs 120*x*, 120*y*, and 120*z* to relay 180*x*, and UE 120*k* to relay 180*y*, may indicate a large amount of short message-type traffic within the service area of base station 110*a*, and thereby may indicate a large amount of overhead in that service area.

For example, and as discussed herein, UE 120*x* may announce a time varying encrypted hash of its expression, (e), as $h_{120x}(e_1,t)$ at each time (t). Any trusted device (such as UE 120*y*) that knows expression (e) can match the received bits by computing h(e,t) at time (t). Further, UE 120*y* and UE 120*x* can transmit and receive these computed h(e,t) over relay 180*x*. Although this may increase the overhead with respect to the communication between each of UEs 120*x* and 120*y* and relay 180*x*, the increase in overhead will be less than would be expected were each of UEs 120*x* and 120*y* to monitor all frequency bands and all operators for peer discovery signals.

More particularly, the hashed expressions (and/or the time varied hashed expressions) of UE 120*x* and 120*y* may contain, by way of non-limiting example, 70 bits of information. In certain embodiments employing a time varied hashed expression to more suitably avoid tracking and spoofing by malicious nodes, UEs 120*x* and 120*y* may each use a hash private key, as discussed herein, to encrypt, and UEs 120*x*, 120*y*, and 120*k* may share (i.e., each UE in this P2P grouping knows) a knowledge of (e) for each respective UE and the hash public key to allow for decryption of each respective h(e,t) (those skilled in the art will appreciate that the hash public key may be changed periodically). Thus, only UEs 120*x*, 120*y*, and 120*k* should be able to decrypt the respective time varied hashed expression for peer discovery of each of the other UEs in this P2P group.

Although the discussion hereinafter may refer solely to "expression(s)," those skilled in the art will appreciate that, for the purposes of the immediately following discussion, the referenced expressions may or may not be hashed, time varied hashed, or otherwise encrypted, unless otherwise noted.

In a design, if UE 120*k* is operating in a manner distinct from UEs 120*x* and 120*y* (i.e., in a different frequency band in area 503 than UEs 120*x* and 120*y* in area 501, or under a different operator), it may not be feasible for each UE in the previously discussed P2P group (UEs 120*x*, 120*y*, 120*k*) to transmit/receive in all possible bands to detect the other UEs' expressions, i.e., the other UEs' peer discovery signals. However, UEs 120*x* and 120*y* are associated with relay 180*x*, and UE 120*k* is associated with relay 180*y*. Thus, each UE may use an uplink channel to send its respective expression to the corresponding relay, and the corresponding relay may then broadcast/rebroadcast this expression as a secure expression. Moreover, relays 180*x* and 180*y* may similarly exchange the expressions received in their respective uplink channels. Thus, each of relays 180*x* and 180*y* may rebroadcast, in its own cell area or subsystem, the expressions of UEs in another cell, thereby allowing peer UEs in a wide range or in different frequency band to receive each other's expression(s).

Further, in a design, each of UEs 120*x*, 120*y*, and 120*k* may aggregate expression(s) (received, or more preferably sent) over a certain period of time, and may then send the aggregated expressions to its respective relay 180*x*, 180*y*, through an uplink channel. For example, if the expression for UEs 120*x*, 120*y*, 120*k* is 70 bits long, and the peer discovery interval is 8 ms, each UE may aggregate all expressions over an hour (which is equivalent to approximately 4K byte of aggregated data) into a packet, and each UE may then send its aggregated packet to its respective relay. After receiving the aggregated packets, each relay 180*x*, 180*y* may reproduce the 70 bits expression for each 8 ms peer discovery interval, and may broadcast only the corresponding 70 bits expression every 8 ms. If an originating UE 120*y* does not want to be discovered by UEs 120*x*, 120*k*, UE 120*y* may simply inform the relay 180*x*, such as by an uplink message, to stop the broadcasting of the expression for UE 120*y*, and/or may not send its aggregated packet for a time period in which UE 120*y* does not wish to be discoverable. In such an exemplary embodiment, only one uplink transmission may be needed every hour per UE, and thus the overhead associated with sending the expression(s) to the relay may be greatly reduced.

Moreover, and as discussed herein for increased security, each UE may broadcast a time varied hash of its expression, $h(e,t)$, to its respective relay. However, and as also mentioned previously, this may cause increased overhead in communications within an area or subsystem 501, 503. Thus, in a design, each UE 120*x*, 120*y*, 120*z*, 120*k* may solely hash (rather than time varying hash) its expression, $h(e)$, and the increased security and reliability afforded by time varying the hashed expression may be performed by the respective relay.

For example, it is likely that UE 120*x* may trust relay 180*x* not to spoof or track UE 120*x*. As such, UE 120*x* may simply compute a one time secure hash, $h_{120x}(e)$, of its expression (e). This hash may then be securely communicated to relay 180*x*. Relay 180*x* may then, at each time (t), compute a time varied hash of the first hash, $h_{180x}((h_{120x}(e)),t)$, and may broadcast this time varied hash. Any trusted device, such as UE 120*y* and UE 120*k*, that knows expression (e) and the public key may then match the received bits to discover UE 120*x* by computing $h_{180x}((h_{120x}(e)),t)$ at time (t). Accordingly, peer discovery through relay 180*x* in this embodiment is secure, without letting relay 180*x* know the base expression (e) for UE 120*x*, and without incurring the extra overhead of communicating $h_{120x}(e, t)$ to and through relay 180*x*. This is referred to herein as a multi-level, or multi-party, time varied hashing.

In instances in which UE 120*x* wishes to authorize relay 180*x* to broadcast on its behalf only for a limited time, a further level may be implemented in the multi-level time varied hashing. For example, if UE 120*x* wishes to authorize relay 180*x* only for limited time, UE 120*x* may generate a time varied hashed expression, $h_{120x}(e, t_1)$, and may share the time varying hash function, $h_{120x}$, with relay 180*x*. Relay 180*x* may then broadcast $h_{180x}(h_{120x}(e,t_1), t_2)$, but only for the time during which time varying hash function, $h_{120x}(t)$, has been shared with relay 180*x*, that is, during the time for which relay 180*x* has the hash public key. Upon modification of the hash function, $h_{120x}$, if relay 180*x* does not receive the updated hash public key, the relay will no longer be able to broadcast a recognizable expression for UE 120*x*. Further, the aforementioned problem of increased overhead in the instance in which UE 120*x* relays a time varied hash, $h_{120x}(e,t)$, to relay 180*x* may be addressed in this embodiment by slowing the time variance rate of hash $h_{120x}$. That is, the time variance rate for the hash by UE 120*x* may be at a slow rate, such as once per hour, so that the relay 180*x* need not occupy overhead in continuously receiving and/or calculating a time variance function that need be repeatedly received and/or calculated in short time frames due to its rapid rate of change. It will be appreciated by those skilled in the art that the time variance function, $h_{120x}(t)$, may have a change rate corresponded to the time for which relay 180*x* is to have the ability to broadcast a recognizable expression for UE 120*x*.

In such an exemplary embodiment, it may be preferred that the time varied hash function broadcast by the relay 180*x* have a much faster rate of change than the time varied hash performed by UE 120*x* (i.e., that $h_{180x}$ have a more rapid rate of change than $h_{120x}$). This may be necessitated to maintain the security and reliability of the broadcast by relay 180*x*, because relay 180*x*, although trusted for the term of $h_{120x}$ by UE 120*x*, cannot insure the trustworthiness of other nodes or devices receiving its broadcast transmissions. By way of non-limiting example, $h_{120x}$ may be a time varied function with a change rate of one hour, while $h_{180x}$ may be a time varied function with a change rate on the order of seconds, such as every 5 or 10 seconds.

Correspondingly, and with respect to FIG. 5, a UE may monitor for the expressions of other UEs in a desired P2P group for broadcast from a correspondent relay. The list of expressions (and/or of hashed expressions, or time varied hashed expressions) of UEs for which each respective UE wishes to monitor may be registered with the correspondent relay (and/or with a directory agent 140 associated with a correspondent relay). For example, UE 120*y* may register with relay 180*x* a desire to monitor for the expressions of UE 120*x* and 120*k*, but might not include in its monitoring list, or "match list," UE 120*z*.

In such a case, relay 180*x* may broadcast expressions for UE 120*x* and 120*k*, for receipt by UE 120*y*. However, if neither UE 120*y* nor any UE corresponding to relay 180*x* wishes to communicate with UE 120*z*, relay 180*x* may receive the expression of UE 120*z*, but may elect to not dedicate the resources required to time varying hash the expression of UE 120*z*, nor to broadcast a time varied hash of the expression of UE 120*z*.

Additionally, relay 180*x* may match the expressions (or hashed or time varied hashed expressions) on its list on behalf of a match-list requesting UE. In such a case, relay 180*x* may broadcast the matching expression to the UE having that expression on its match list, as discussed throughout, or may broadcast to the UE having that expression on its match list that the relay 180*x* has located a match. In the latter case, the relay 180*x* may further offer to open communication protocols between the UEs, or direct that communication be initiated to requisite elements of network 100, rather than broadcasting solely the time varied hashed expression of a known UE on a match list.

Figure 6A:
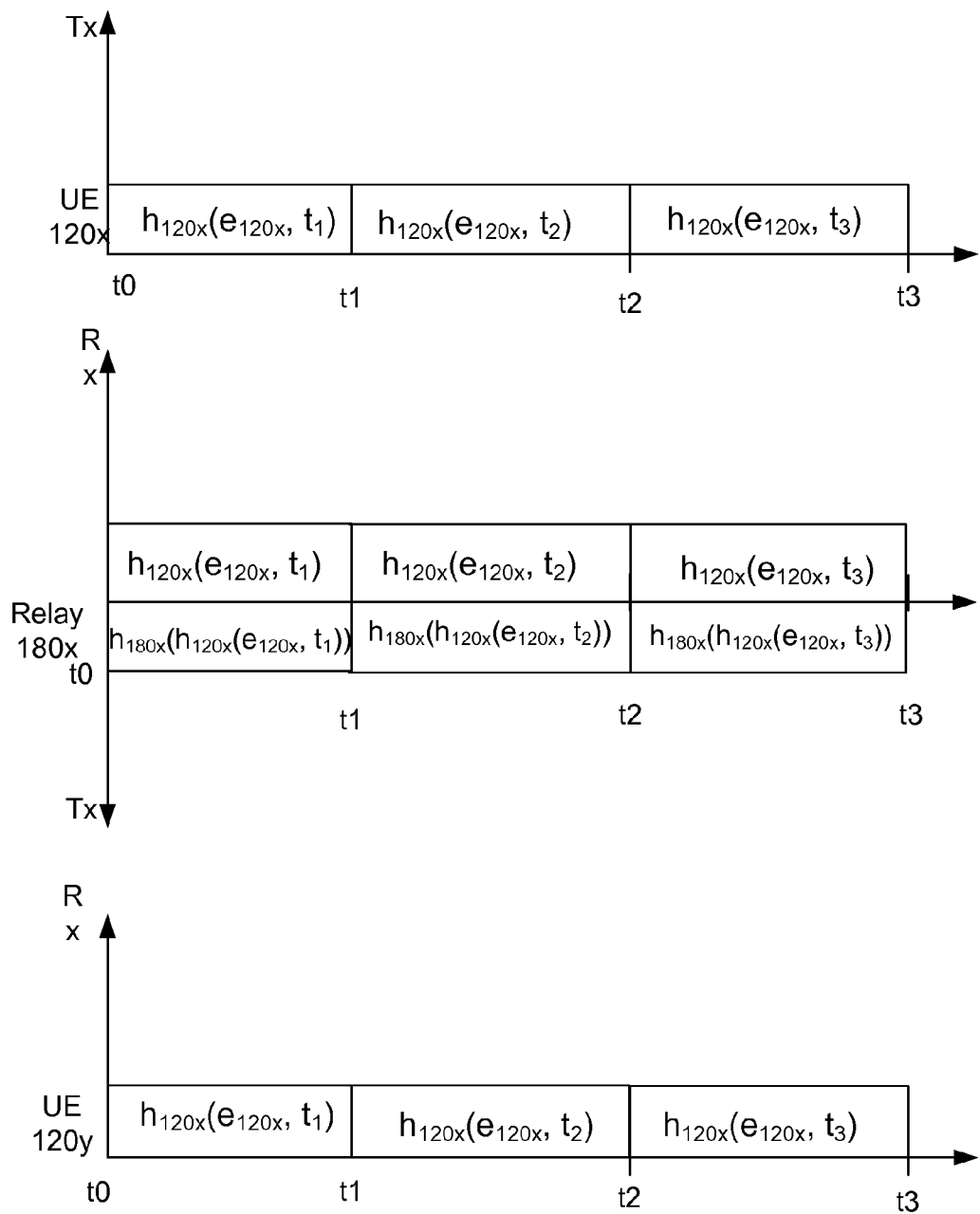
FIGS. 6A and 6B are timing diagrams illustrating certain of the exemplary embodiments of the disclosure.

FIG. 6A is a timing diagram illustrating certain of the exemplary embodiments discussed above. In the illustration, UE 120*x* sends a hash of its expression, $h_{120x}(e_{120x}, t_1)$, for time t0 to t1, and a different hash, $h_{120x}(e_{120x}, t_2)$, for time t1 to t2, and a different hash, $h_{120x}(e_{120x}, t_3)$, for time t2 to t3. In the illustration, and per certain of the foregoing examples, relay 180*x* is possessed of the hash public key for $h_{120x}(e_{120x}, t)$. Thus, relay 180*x* generates a time varied hash, $h_{180x}$ of the hashed expression of UE 120*x*, $h_{180x}h_{120x}(e_{120x}, t_1)$, for time t0 to t1, and a different hash, $h_{180x}h_{120x}(e_{120x}, t_2)$, for time t1 to t2, and a different hash, $h_{180x}h_{120x}(e_{120x}, t_3)$, for time t2 to t3.

The time varied hash of the hashed expression for UE 120*x*, $h_{180x}(h_{120x}(e_{120x}, t))$, is thus recognizable to other UEs (e.g. UE 120*y*) that know expression (e) and the public key. Thus, UE 120*y*, which is in the peer group of UE 120*x* can decrypt the expression for UE 120*x* at times $t_1$, $t_2$, and $t_3$, respectively.

Figure 6B:
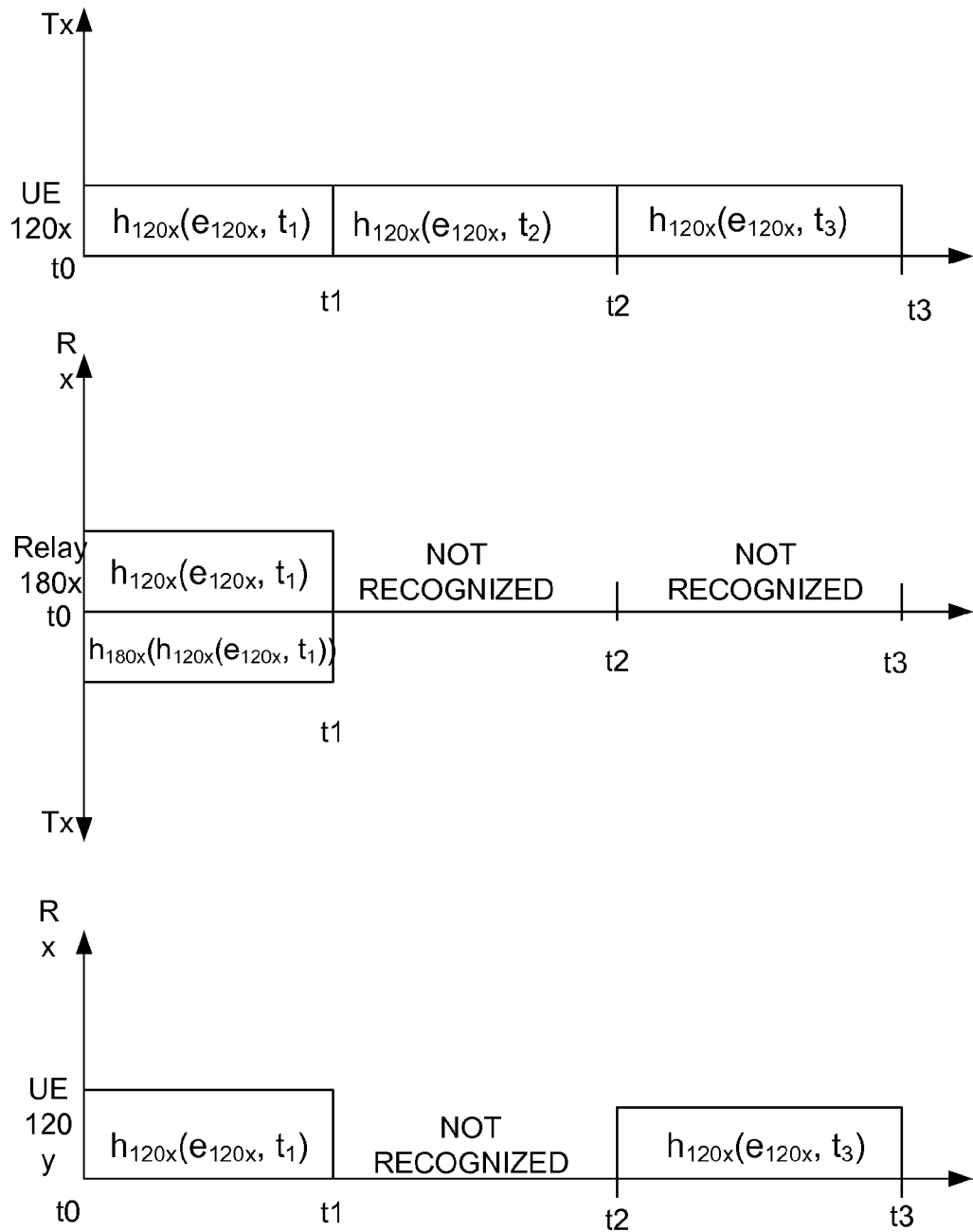

FIG. 6B is another timing diagram illustrating certain of the exemplary embodiments discussed above. In the illustration, UE 120*x* sends a hash of its expression, $h_{120x}(e_{120x}, t_1)$, for time t0 to t1, and a different hash, $h_{120x}(e_{120x}, t_2)$, for time t1 to t2, and a different hash, $h_{120x}(e_{120x}, t_3)$, for time t2 to t3. In the illustration, and per certain of the foregoing examples, relay 180*x* is possessed of the hash public key for $h_{120x}(e_{120x}, t_1)$, but is not possessed of the key for $h_{120x}(e_{120x}, t_2)$ or $h_{120x}(e_{120x}, t_3)$. That is, relay 180*x* is trusted to relay the hashed expression of UE 120*x* only for a limited time, namely time t1, and thereafter, upon a change to the hash function, relay 180*x* is no longer capable of relaying a proper hashed expression for UE 120*x*.

Consequently, and as illustrated, relay 180x does not recognize the hashed expression of UE 120x at times t2 or t3. Thus, relay 180x generates a time varied hash, $h_{180x}$, of the hashed expression of UE 120x, $h_{120x}(e_{120x},t)$, only for the time in which relay 180x can discern $h_{120x}(e_{120x},t_1)$, namely for time t1. The time varied hash of the hashed expression for UE 120x, $h_{180x}(h_{120x}(e_{120x},t_1))$, is thus recognizably (to other UEs) broadcast only at time t1, and not for times t2 and t3.

Thus, UE 120y, which is in the peer group of UE 120x, can decrypt the expression for UE 120x at time t1. In the illustrated timing diagram, UE 120y also has the hash public key for directly decrypting the hashed expression of UE 120x at time t3, $h_{120x}(e_{120x},t_3)$, when presumptively UE 120x is in range of UE 120y at time t3 (but may not have been in peer discovery range for at least t2). Thus, UE 120y can detect UE 120x at time t1 (at least through relay 180x), and at time t3 (without relay 180x), although relay 180x can recognize the hashed expression of UE 120x only during time t1.

Figure 7:
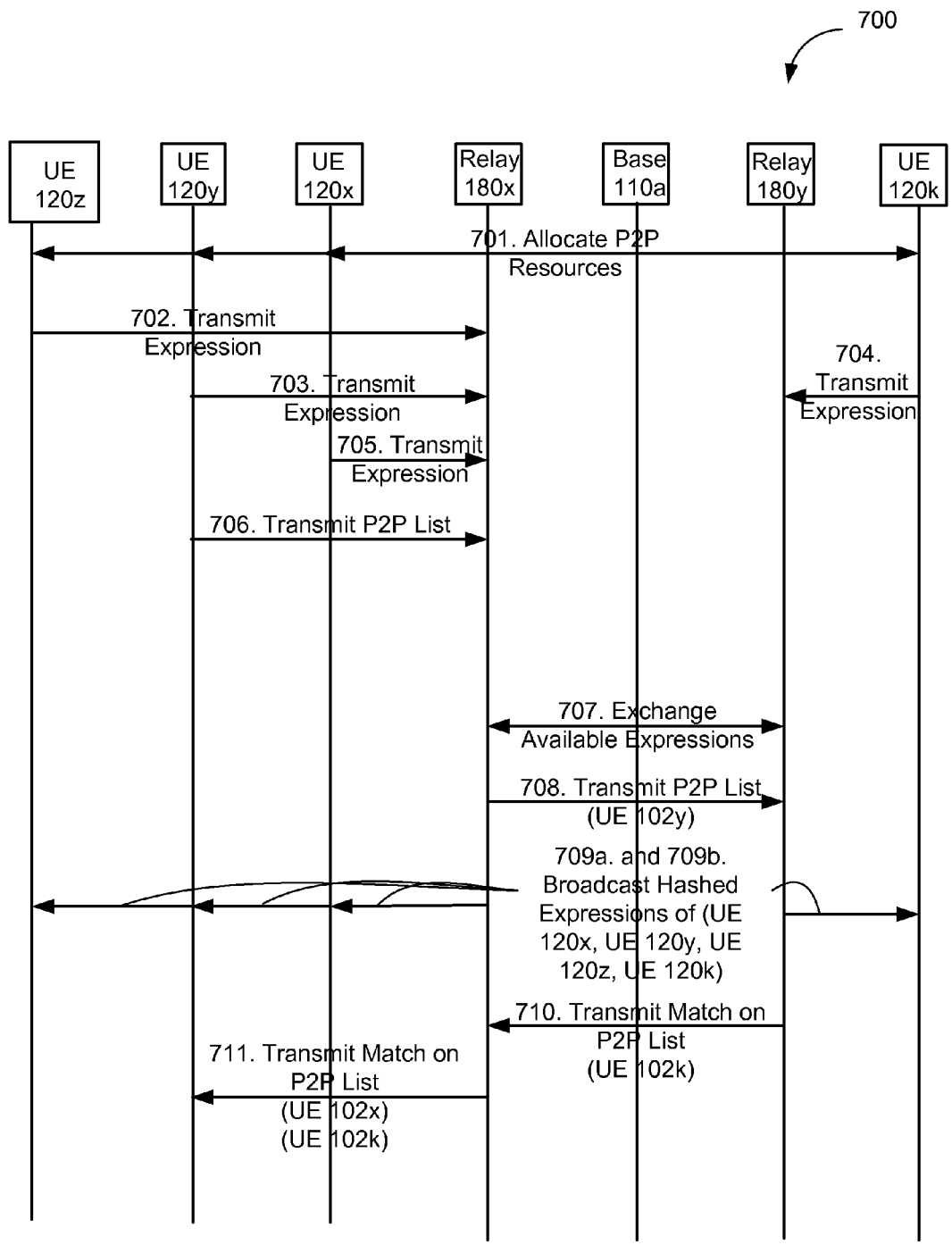
FIG. 7 is a network signaling diagram, such as for a wireless network, in an embodiment

FIG. 7 is a network signaling diagram 700, such as for network 100 and as illustrated with respect to the exemplary embodiment of FIG. 5. In the illustration, base station 110a signals to allocate P2P resources for certain of the devices in area 501 (namely UEs 120x, 120y, and 120z) and in area 503 (namely UE 120k), at step 701. At steps 702, 703, 704, and 705, UEs 120z, 120y, 120k, and 120x, respectively, transmit an expression (and/or a hashed or time varied hashed expression) to the relay for their respective areas, namely relays 180x and 180y, respectively.

At optional step 706, at least one UE in at least one area (UE 120y in the illustrated example) may transmit a match list, such as for UEs with which UE 120y desires P2P communication, as discussed above. In optional step 707, relays 180x and 180y may exchange identifiers, such as the expressions, of UEs available in their respective areas, such as at a designated time. This may occur, for example, via the backhaul. Further, at additional optional step 708, any P2P match lists received by the relays 180x, 180y may be exchanged between the relays 180x, 180y, such as via the backhaul, so that each relay has knowledge of any UEs in its respective area that are on the match list of a UE in another area.

At steps 709a and 709b, each of relays 180x and 180y may broadcast their respective time varied hashes of the received expressions (or hashed or time varied hashed expressions), which broadcasts may be received by UEs 120x, 120y, 120z and 120k. Of note, in certain instances in which UE 120z is not a part of any P2P group and does not appear on any match lists, the time varied hash of the expression for UE 120z may not be transmitted by the relays 180x, 180y.

If UE 120y has optionally submitted a match list (also referred to as a P2P match list, or P2P list) to its associated relay 180x, at step 706, and if relay 180x has shared the match list with relay 180y at optional step 708, and if relay 180y has detected a UE on any match list (UE 120k) from step 707 (be it the match list known to relay 180y or another relay), at optional step 710 relay 180y may communicate the presence of a UE (UE 120k) on a match list to the requesting match list relay 180x. Finally, if a match list match is detected, the match may be communicated to the UE 120y that submitted the match list by its associated relay 180x at optional step 711.

Figure 8:
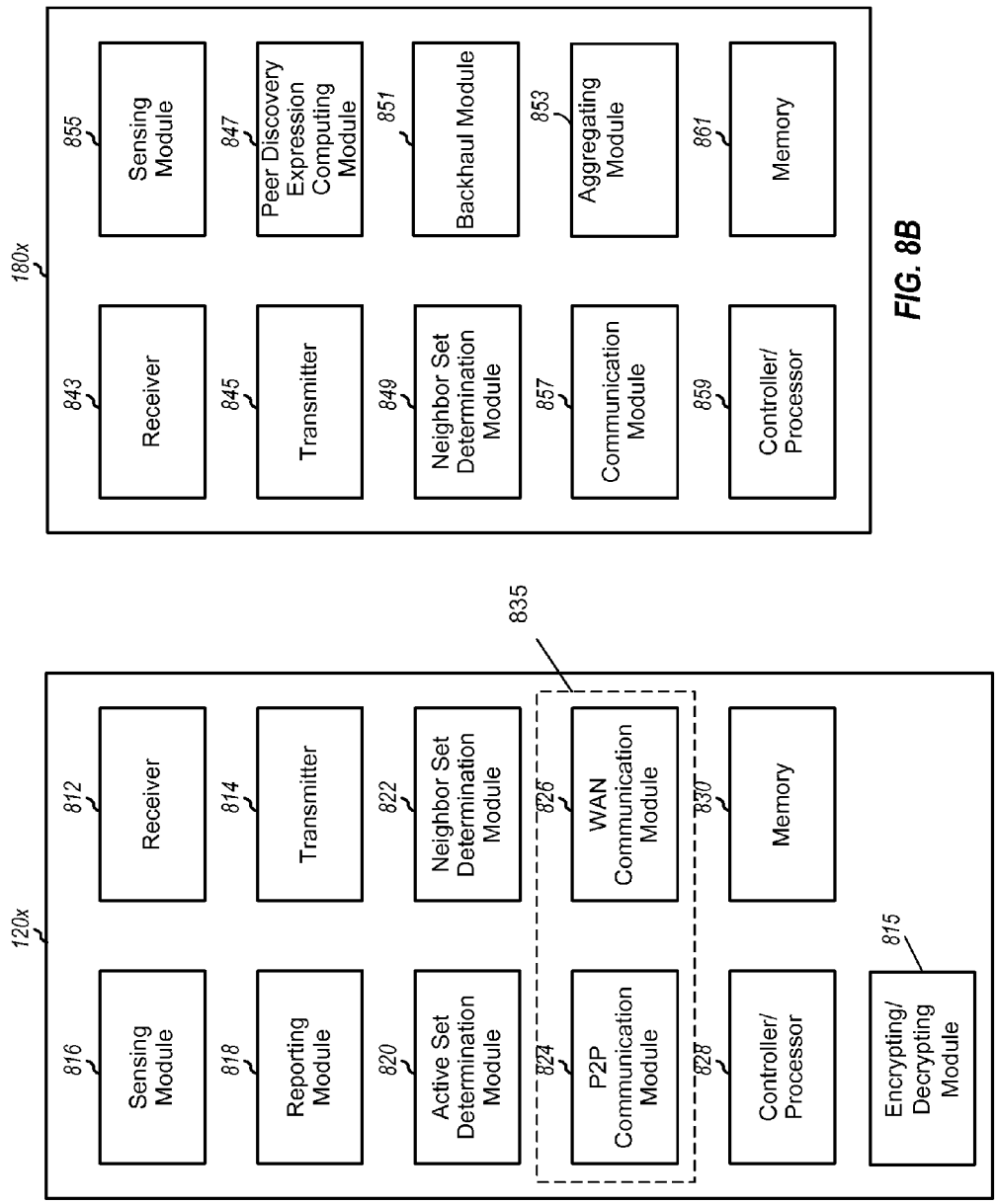
FIG. 8A shows a block diagram of a UE configured to communicate in P2P mode and WAN mode in an embodiment.
FIG. 8B shows a block diagram of a relay supporting WAN communication, and at least peer discovery for P2P communication in an embodiment.

FIG. 8A shows a block diagram of a UE 120x configured to communicate in a P2P mode and a WAN mode according to the disclosure. Within UE 120x, a receiver 812 may receive P2P signals transmitted by other UEs for P2P communication, peer discovery signals (including the expressions, hashed expressions, and/or time varied hashed expressions discussed herein), and downlink signals transmitted by base stations for WAN communication, by way of non-limiting example. A transmitter 814 may transmit P2P signals to other UEs for P2P communication, peer discovery signals (including the expressions, hashed expressions, and/or time varied hashed expressions discussed herein), and uplink signals to base stations for WAN communication, by way of non-limiting example.

An encrypting/decrypting module 815 may encrypt, such as via hashing or time varied hashing, identifying information for UE 120x, such as an expression of UE 120x, for transmission by transmitter 814, such as to other UEs and/or associated relays 180x, for secure peer discovery. Module 815 may also decrypt, such as using a hash public key, identifying information for other UEs, such as the expressions of other UEs received by receiver 812 (such may be received from other UEs and/or associated relays 180x for secure peer discovery). A sensing module 816 may detect the presence of other UEs, such as using decrypted peer discovery signals received from relays 180x, 180y and/or other devices and decrypted by module 815, and may detect the presence of base stations, and may measure channel gains, received power, and the like, for the detected UEs, for relays 180x, and for base stations.

Yet further, optionally included in UE 120x may be an aggregating module, such as encrypting/decrypting module 815, for aggregating the expressions generated by UE 120x over a predetermined time period. For example, UE 120x may aggregate its plurality of expressions, such as its expressions, hashed expressions, or time varied hashed expressions, over a predetermined time, into a single packet suitable for transmission. Thereafter, the single packet may be broadcast, via transmitter 814, to UEs and or associated relay 180x upon expiration of the predetermined time period.

An active set determination module 820 may determine an active set, i.e., UEs desired for communication, in sufficient proximity for communication, and/or UEs available to communicate, for UE 120x based on the measurements, such as of peer discovery signals and/or signals received from relays 180x, 180y, for example, which measurements may be made by sensing module 816. Active set determination module 820 may include a listing module, from which UE 120x may indicate a list of members of the active set with whom communication is requested, and/or a list of desired members for the active set. A neighbor set determination module 822 may determine a neighbor set of UE 120x (if applicable) based on the active set of the UE 120x, the active sets of other UEs communicating with UE 120x, and/or UEs known to a communicative (with the UE 120x) base station or relay 180x. A reporting module 818 may send information indicative of the active set, neighbor set, peer signals and signal strengths, and channel gains, for example, to a corresponded base station, relay 180x, and/or to other UEs.

A P2P communication module 824 may support P2P communication, e.g., may generate and process signals used for P2P communication. A WAN communication module 826 may support WAN communication, e.g., may generate and process signals used for WAN communication. P2P communication module 824 and WAN communication module 826 may be referred to collectively as communications module 835. The various modules within UE 120x may operate as described hereinthroughout. A controller/processor 828 may direct the operation of various modules within UE 120x. A memory 830 may store data and program codes for UE 120x.

FIG. 8B shows a block diagram of a relay 180x supporting WAN communication, and at least peer discovery for P2P communication. Within relay 180x, a receiver 843 may receive uplink signals transmitted by UEs, base stations 110a, and/or related relays 180y. A transmitter 845 may transmit downlink signals to UEs base stations 110a, and/or related relays 180y.

A peer discovery expression computing module 847 may compute information, such as a time varied hash of the received expression, such as for transmission by transmitter 845. Further, the peer discovery expression computing module 847 may compute peer discovery information based on received peer discovery signals, and may monitor public key and/or hash public key information to enable such computations. A neighbor set determination module 849 may determine a neighbor set of relay 180x, such as, for example, based on the active sets of UEs communicating with relay 180x, and based on adjacent or related base stations and relays. Neighbor set module 849 may additionally receive and maintain lists of expressions of UEs on whose behalf the receiving relay 180x is authorized to broadcast an expression, and may further maintain listings received of, and query the peer discovery computing module 847 for the presence of, expressions of UEs with which other UEs particularly wish to communicate.

Relay 180x may employ backhaul module 851 to communicate with other network entities, such as other relays and/or base stations. Aggregating module 853 may accumulate data, such as over a certain time frame, for aggregating into a packet or packets. Sensing module 855 may detect the presence of UEs, and may measure channel gains, received power, and the like, for example, of the detected UEs. A communication module 857 may support uplink and downlink communication for UEs and may, for example, generate and process signals used for WAN communication. The various modules within relay 180x may operate as described herein. A controller/processor 859 may direct the operation of various modules within relay 180x. A memory 861 may store data and program codes for relay 180x.

Figure 9:
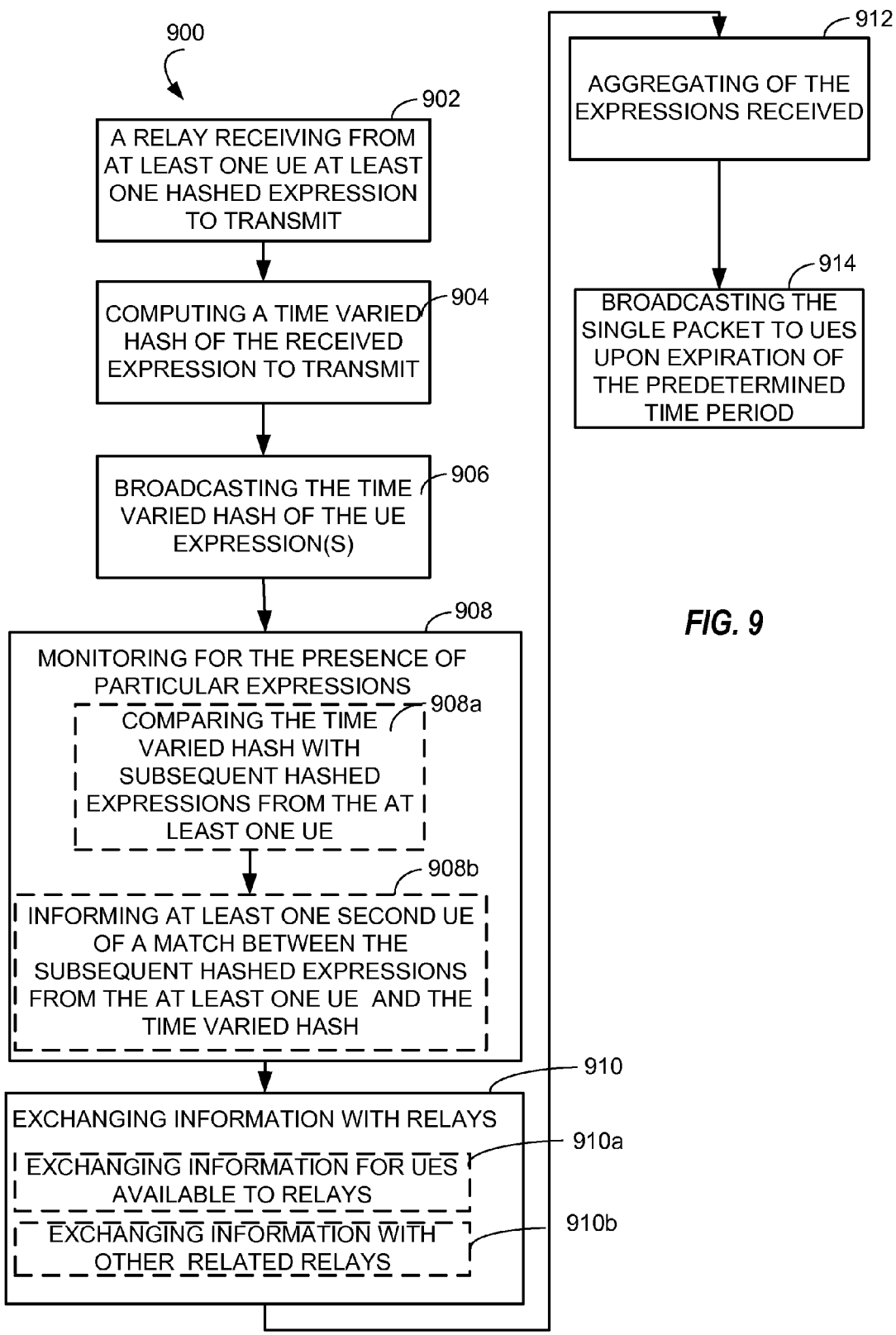
FIG. 9 is a flow diagram illustrating a method of a relay assisted peer discovery in an embodiment.

FIG. 9 is a flow diagram illustrating a method 900 of a relay assisted peer discovery according to the disclosure. The method may be, at least in part, directed to enabling discovery in a wireless communication network, and this enabling of the peer discovery may be provided by, for example, a relay 180x. The method may include, for example, the step 902 of receiving (such as via receiver 843), such as from at least one UE (i.e., UE 120x, UE 120y), an identifying expression of the UE to transmit/broadcast. The identifying expression may be, for example, a hashed expression, and/or a time varied hashed expression. In the case of a time varied hashed expression received at step 902, the time variation may have a long period, such as on the order of minutes or hours, so as to avoid excessive overhead.

The method may further include, at step 904, computing a time varied hash of the received expression to transmit (such as via peer discovery expression computing module 847). This computation of a time varied hash of the received expression may, in certain embodiments, only be performed for UEs on whose behalf the receiving relay is authorized to broadcast an expression (such as may be indicated by neighbor set determination module 849). Of course, those skilled in the art will appreciate that this authorization may be performed blind (i.e., without knowledge) to the actual identity of a UE. Further, those skilled in the art will appreciate that the computing corresponding to the authorization may be incapable of decoding the hashed expression of the UE.

At step 906, the method may include a broadcast transmission of the time varied hash of the UE expression(s) (such as via transmitter 845). Thereby, discovery of at least one UE (e.g., UE 120x) by at least a second UE (e.g., 120y) may be enabled by method 900. Those skilled in the art will further appreciate that certain steps of method 900, such as the computing step and the broadcasting step, may be performed iteratively, such as on a certain periodicity. In embodiments wherein the relay receives a time varied hashed expression at the receiving step 902, the periodic iteration of the computing and broadcasting may typically occur at a more rapid periodicity than the rate of the time varying function of the received time varied hashed expression.

The relay 180x may further, at optional steps 908a and b, monitor (such as by monitoring neighbor set determination module 849) for the presence of subsequent hashed expressions from the at least one UE, such as in the case wherein the relay 180x is in receipt, at the receiving step 902, of a match list from a UE 120y having particular interest in P2P communication with UEs on a match list. For example, the monitoring step may include, at step 908a, comparing a received UE's expression (or hashed or time varied hashed expression) with a received list of subsequent hashed expressions of interest to UE 120y. If a match is found, step 908b of the monitoring may include informing, such as via a general or directed broadcast, the UE 120y that provided the list of expressions of interest of the presence of at least one UE having an expression matching the listed subsequent hashed expressions of interest.

Additionally, optionally included in method 900 may be the steps 910a and b of exchanging information with other relays (such as via backhaul module 851). For example, at step 910a, relay 180x may exchange information, such as expressions (or hashed or time varied hashed expressions) for UEs available to relay 180x and its related relays (relay 180y). Additionally, at step 910b, relay 180x may exchange other information, such as match lists for monitoring at step 908, and any matches located on a communicated match list, with related relays (such as relay 180y).

Yet further, optionally included in method 900 may be the aggregating (such as by aggregating module 853) of the expressions received at step 902, at step 912. For example, in response to receiving a plurality of expressions during a future time period, relay 180x may aggregate the plurality of expressions, and may preferably aggregate a time varied hash of each of the received expressions, into a single packet suitable for transmission on the downlink. Thereafter, at step 914, prior to the commencement of the future time period, the single packet may be transmitted (such as via transmitter 845) to a relay configured to broadcast the single packet during the future time period.

Figure 10:
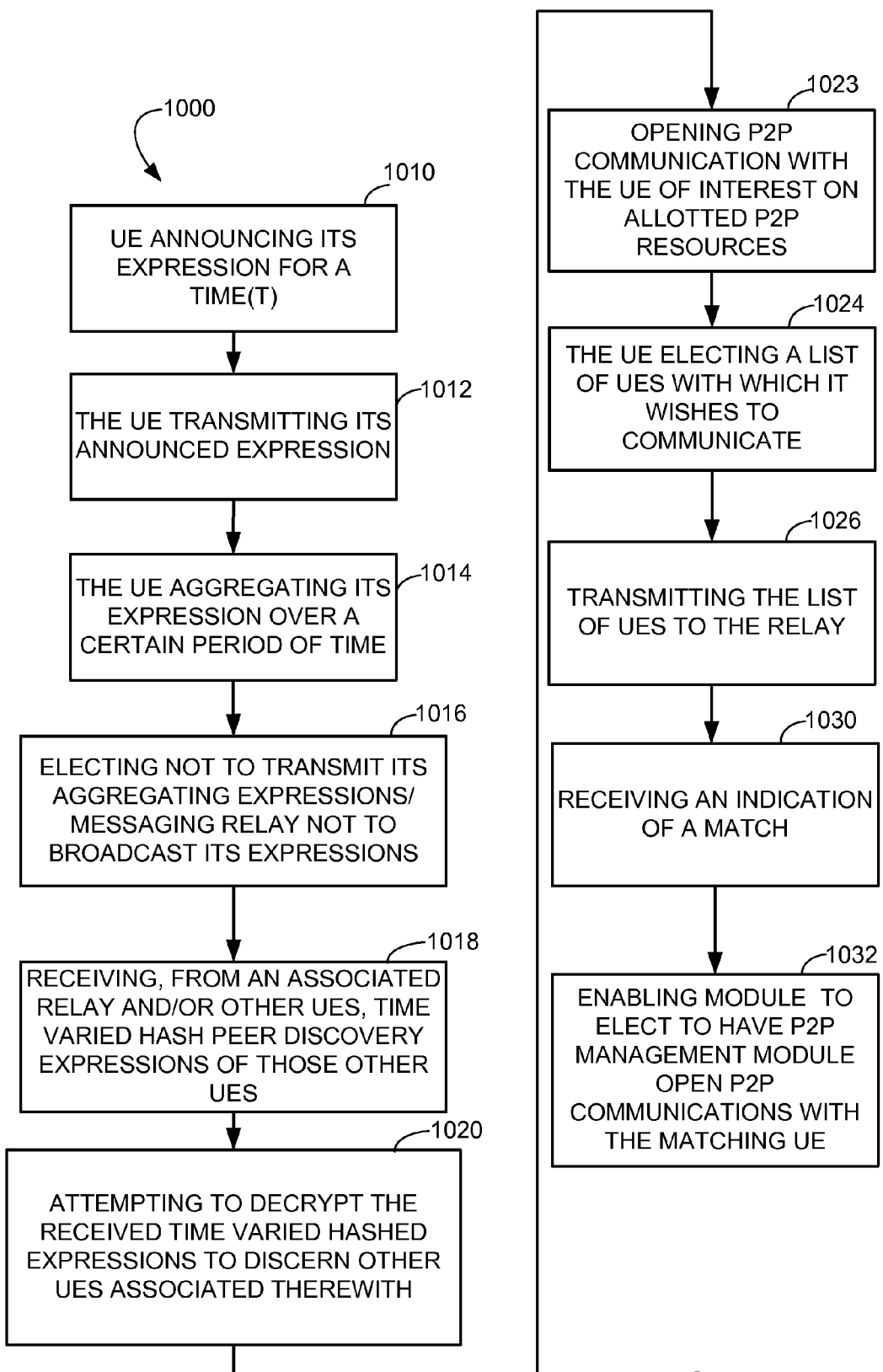
FIG. 10 is a flow diagram illustrating a method for operation of a UE in relay assisted peer discovery in an embodiment.

FIG. 10 is a flow diagram illustrating a method 1000 for operation of a UE 120x in relay assisted peer discovery. In method 1000, UE 120x may announce (such as via module 815) its expression, such as its hashed expression or a time varying encrypted hash of its expression, for a time (t), at step 1010. Announcing step 1010 may be in accordance with a request for services, offering of services, and/or a desire for P2P communication. As such, announcing step 1010 constitutes participation in peer discovery. UE 120x may transmit, such as via an uplink channel, its announced expression at step 1012 (such as via transmitter 814), such as to other UEs and to one or more associated relays 180x.

At optional step 1014, UE 120x may aggregate its expression (and/or its received expressions) over a certain period of time (such as via module 815), for transmitting to its respective relay 180x upon expiration of that period of time, through an uplink channel (such as via transmitter 814). If originating UE 120x does not want to be discovered by other UEs, it may elect not to transmit its aggregated expressions, and/or it may message (such as via an uplink message) relay 180*x* not to broadcast its expressions (such as via module 815 and transmitter 814), at step 1016.

At step 1018, UE 120*x* may receive (such as via receiver 812), from an associated relay 180*x* and/or from other UEs, time varied hashed peer discovery expressions of those other UEs. UE 120*x* may attempt decrypt the received time varied hashed expressions to discern other UEs associated with those time varied hashed expressions (such as via module 815), at step 1020. Those skilled in the art will appreciate that only those expressions of UEs known to UE 120*x*, and/or for which UE 120*x* is in possession of a hash public key, may be decryptable by UE 120*x*. If ones of the other UEs discerned are of interest for communication with UE 120*x* (such as via module 820), a P2P communication may be opened (such as via P2P communication module 824) with the UE of interest on P2P resources allotted, for example, by associated base station 110*a*, at step 1023.

Additionally, at optional step 1024, UE 120*x* may elect a list of UEs with which it wishes to communicate (such as via module 820), i.e., a "match list," for transmission to relay 180*x* at step 1026. Of course, in the event relay 180*x* locates a matching UE to the match list, UE 120*x* may receive an indication of this match from relay 180*x* (such as via receiver 812) at step 1030, to thus enable module 820 to elect to have P2P communication module 824 open P2P communications with the matching UE, such as via transmitter 814, at step 1032.

Figure 11:
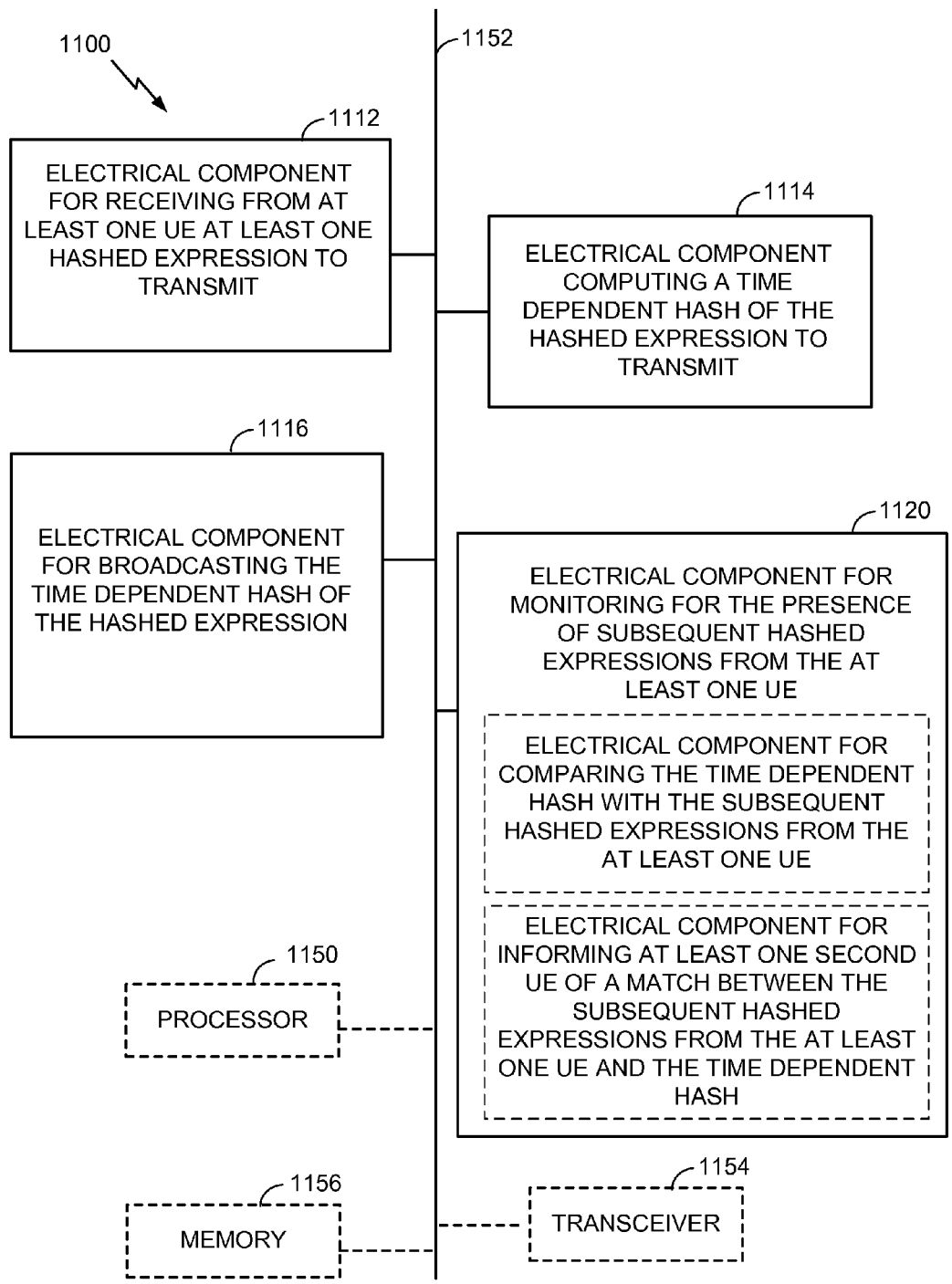
FIG. 11 is a block diagram illustrating an exemplary apparatus that may be configured as a network entity in an embodiment.
Figure 12:
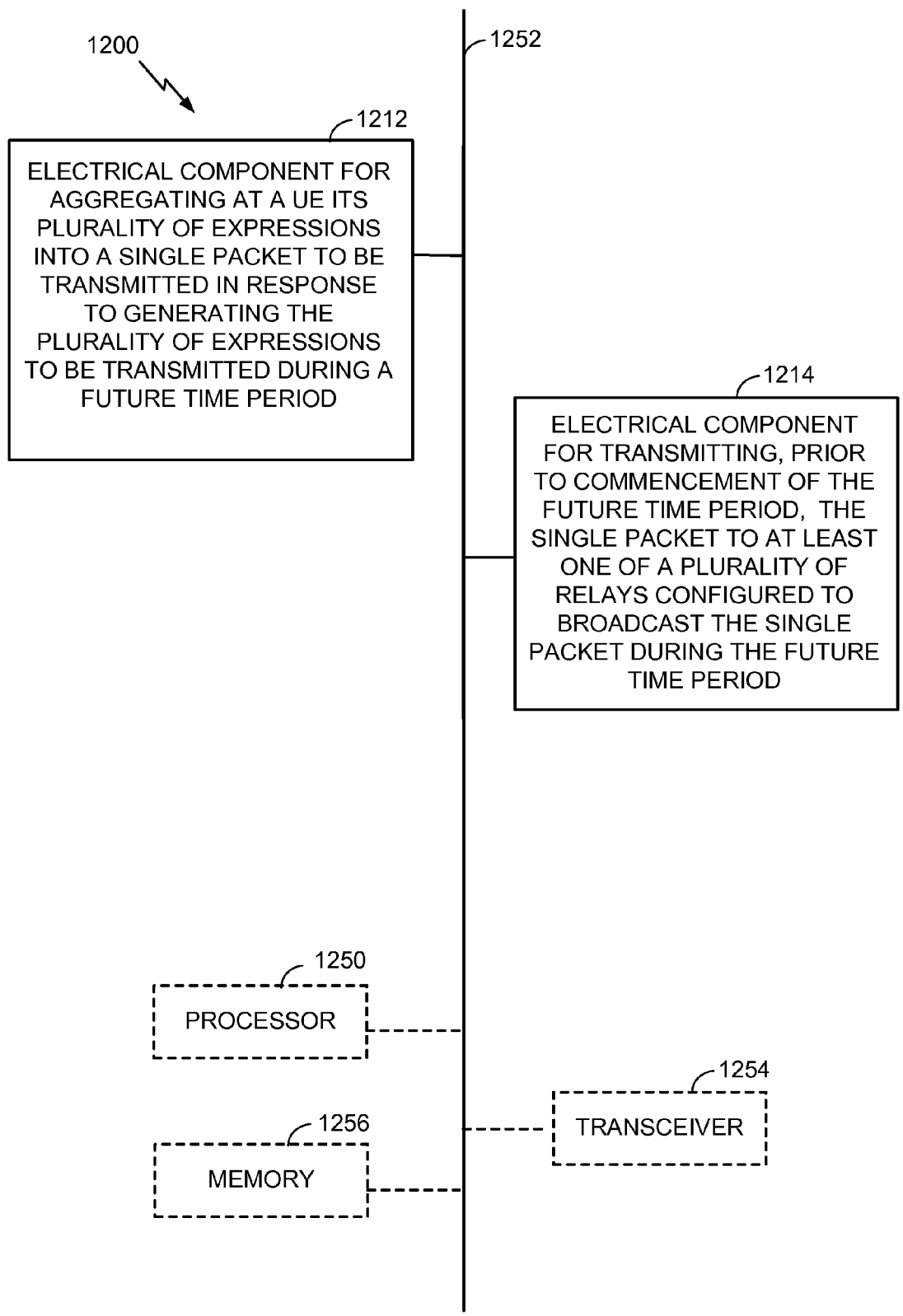
FIG. 12 is a block diagram illustrating an exemplary apparatus that may be configured as a network entity in an embodiment.

With reference to FIG. 11, there is provided an exemplary apparatus 1100 that may be configured as a network entity (e.g., relay) in a wireless network, or as a processor or similar device/component for use within the network entity. The illustrated network entity may perform the functions discussed to provide for relay assisted peer discovery. The apparatus 1100 may include functional blocks that can represent functions implemented by a processor, software, or a combination thereof (e.g., firmware). For example, apparatus 1100 may include an electrical component or module 1112 (e.g., receiver 843 of relay 180*x*) for receiving from at least one UE at least one hashed expression to transmit. The apparatus 1100 may also include an electrical component or module 1114 (e.g., a peer discovery expression computing module 847 of the relay 180*x*) for computing a time dependent hash of the hashed expression to transmit. The apparatus 1100 may also include an electrical component or module 1116 (e.g., the transmitter 845 of the relay 180*x*) for broadcasting the time dependent hash of the hashed expression. Electrical component or module 1120 (which may be, for example, the neighbor set determination module 849 of the relay 180*x*) may monitor for the presence of subsequent hashed expressions. Electrical component or module 1120 may also compare the time dependent hash with the subsequent hashed expressions from the at least one UE; and inform at least one second UE of a match between the subsequent hashed expressions from the at least one UE and the time dependent hash With reference to FIG. 12, there is provided an exemplary apparatus 1200 that may be configured as a network entity (e.g., UE 120*x*) in a wireless network, or as a processor or similar device/component for use within the network entity. The illustrated network entity may perform the functions discussed to engage in relay assisted peer discovery. The apparatus 1200 may include functional blocks that can represent functions implemented by a processor, software, or a combination thereof (e.g., firmware). For example, apparatus 1200 may include an electrical component or module 1212 (e.g., encrypting/decrypting module 815 of UE 120*x*) for aggregating at a UE its plurality of expressions into a single packet suitable to be transmitted in response to generating the plurality of expressions to be transmitted during a future time period. The apparatus 1200 may also include an electrical component or module 1214 (e.g., a transmitter 814 of UE 120*x*) for, prior to commencement of the future time period, transmitting the single packet to at least one of a plurality of relays configured to broadcast the single packet during the future time period.

Figure 13:
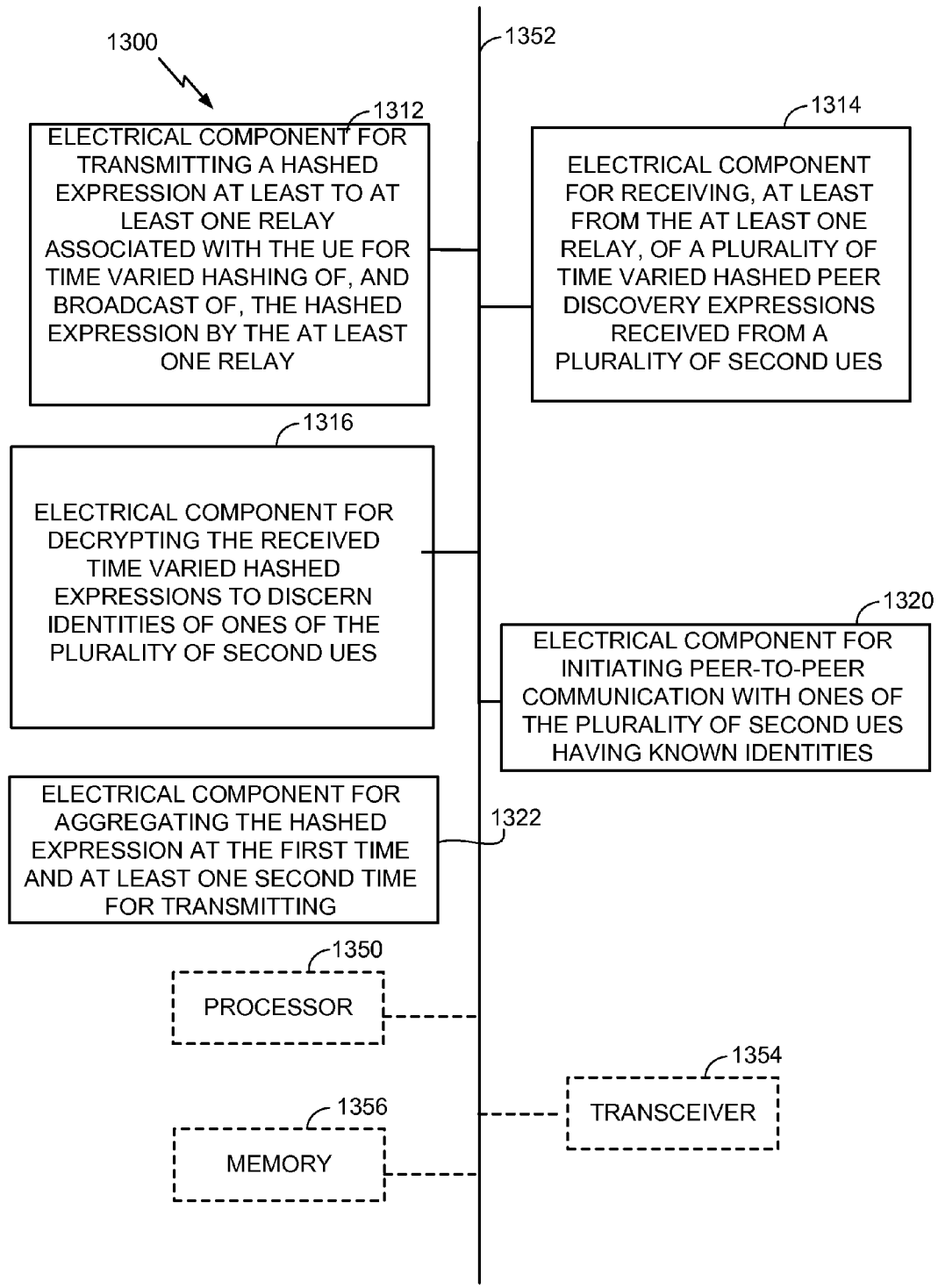
FIG. 13 is a block diagram illustrating an exemplary apparatus that may be configured as a network entity in an embodiment.

With reference to FIG. 13, there is provided an exemplary apparatus 1300 that may be configured as a network entity (e.g., UE 120*x*) in a wireless network, or as a processor or similar device/component for use within the network entity. The illustrated network entity may perform the functions discussed to engage in relay assisted peer discovery. The apparatus 1300 may include functional blocks that can represent functions implemented by a processor, software, or a combination thereof (e.g., firmware). For example, apparatus 1300 may include an electrical component or module 1312 (e.g., transmitter 814 of UE 120*x*) for transmitting a hashed expression at least to at least one relay associated with the UE. The apparatus 1300 may also include an electrical component or module 1314 (e.g., a receiver 812 of the UE 120*x*) for receiving, at least from the at least one relay, of a plurality of time varied hashed peer discovery expressions received from a plurality of second UEs. The apparatus 1300 may also include an electrical component or module 1316 (e.g., the encrypting/decrypting module 815 of the UE 120*x*) for decrypting the received time varied hashed expressions to discern identities of ones of the plurality of second UEs. The apparatus 1300 may also include an electrical component or module 1320 (which may be, for example, the P2P communication module 824 of the UE 120*x*) for initiating peer-to-peer communication with ones of the plurality of second UEs having known identities. The apparatus 1300 may also include an electrical component or module 1322 (which may be, for example, the encrypting/decrypting module 815 of the UE 120*x*) for aggregating the hashed expression at the first time and at at least one second time for transmitting.

In related aspects, apparatus 1100, 1200, and 1300 may optionally include processor components 1150, 1250, and 1350, respectively, which may be in operative communication with the components 1112-1120, 1212-1214, 1312-1322, respectively, via buses 1152, 1252, and 1352, respectively, or via similar communication coupling. The processors 1150, 1250, and 1350 may effect initiation and scheduling of the processes or functions performed by electrical components 1112-1120, 1212-1214, and 1312-1322.

In other related aspects, the apparatus described herein may include a radio transceiver component 1154, 1254, or 1354. A stand alone receiver and/or stand alone transmitter may be used in lieu of or in conjunction with these transceivers 1154, 1254, or 1354. When the apparatus 1100, 1200, or 1300 is a UE or similar network entity, that apparatus may also include a network interface (not shown) for connecting to one or more core network entities. Each of these apparatus 1100, 1100, 1300 may optionally include a component for storing information, such as, for example, a memory device/component 1156, 1256, 1356. The computer readable medium or the memory component 1156, 1256, 1356 may be operatively coupled to the other components of the apparatus 1100, 1200, 1300, such as via the bus 1152, 1252, 1352, or the like. The memory component 1156, 1256, 1356 may be adapted to store computer readable instructions and data for affecting the processes and behavior of the components described in each of the apparatus, and subcomponents thereof, or the processors, or the methods disclosed herein. The memory components described herein may retain instructions for executing functions associated with the components each of the components of each of the apparatus. While shown as being external to the memory components, it is to be understood that each of the components can exist within the respective memory components. It is further noted that the components in FIGS. 11-13 may comprise processors, electronic devices, hardware devices, electronic subcomponents, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of improving peer-to-peer communication in a wireless communication network, comprising:
   in response to generating a plurality of expressions to be transmitted during a future time period, aggregating in at least one packet, the plurality of expressions; and
   prior to the commencement of the future time period, transmitting the aggregated expressions to a relay configured to broadcast the expressions during the future time period.

2. A method of operating a user equipment (UE) in a relay assisted peer discovery, comprising:
   the UE transmitting its hashed expression, at a first time, at least to at least one relay associated with the UE for time varied hashing of, and broadcast of, the hashed expression by the at least one relay;
   the UE receiving, at least from the at least one relay, of a plurality of second time varied hashed peer discovery expressions received from a plurality of second UEs; and
   the UE decrypting the received second time varied hashed expressions to discern identities of ones of the plurality of second UEs.

3. The method of claim 2, wherein said decrypting is in accordance with the identities of the ones of the plurality of second UEs known to the UE.

4. The method of claim 2, wherein said decrypting comprises the UE applying a hash public key.

5. The method of claim 2, further comprising the UE initiating peer-to-peer communication with ones of the plurality of second UEs having known identities.

6. The method of claim 2, further comprising the UE electing a list of the identities of ones of the plurality of second UEs with which the UE wishes to communicate.

7. The method of claim 6, further comprising the UE receiving an indication, at least from the at least one relay, of a match of one of the plurality of second UEs to the list.

8. The method of claim 2, wherein the hashed expression is a time varied hashed expression.

9. The method of claim 2, wherein the hashed expression comprises at least one of a request for services, an offering of services, and a desire for peer-to-peer communication.

10. The method of claim 2, wherein said transmitting is via an uplink channel.

11. The method of claim 2, further comprising the UE aggregating its hashed expression at the first time and at at least one second time for said transmitting.

12. The method of claim 2, further comprising the UE messaging the at least one relay to not broadcast its expression.

13. A method of operating a user equipment (UE) in a relay assisted peer discovery, comprising:
   the UE transmitting its hashed expression, at a first time, at least to at least one relay associated with the UE for time varied hashing of, and broadcast of, the hashed expression by the relay;
   the UE receiving and decrypting, at least from the at least one relay, of a plurality of time varied hashed peer discovery expressions received from a plurality of second UEs.

14. A user equipment (UE) configured to improve peer-to-peer communication in a wireless communication network, comprising:
   in response to generating a plurality of expressions to be transmitted during a future time period, means for aggregating in at least one packet, the plurality of expressions; and
   prior to commencement of the future time period, means for transmitting the at least one packet to at least one of a plurality of relays configured to broadcast the expressions during the future time period.

15. A user equipment (UE) for operation in a relay assisted peer discovery, comprising:
   means for transmitting a hashed expression at least to at least one relay associated with the UE for time varied hashing of, and broadcast of, the hashed expression by the at least one relay;
   means for receiving, at least from the at least one relay, of a plurality of time varied hashed peer discovery expressions received from a plurality of second UEs; and
   means for decrypting the received time varied hashed expressions to discern identities of ones of the plurality of second UEs.

16. The UE of claim 15, wherein the decrypting is in accordance with the identities of the ones of the plurality of second UEs known to the UE.

17. The UE of claim 15, wherein said means for decrypting comprises means for applying a hash public key.

18. The UE of claim 15, further comprising means for initiating peer-to-peer communication with ones of the plurality of second UEs having known identities.

19. The UE of claim 15, wherein the hashed expression is a first time varied hashed expression.

20. The UE of claim 15, further comprising means for aggregating the hashed expression at the first time and at at least one second time for transmitting.

21. A computer program product for improving peer-to-peer communication in a wireless communication network, comprising:
   a non-transitory computer-readable medium associated with a user equipment (UE) in a wireless network, comprising:
   code for causing at least one computer processor associated with the UE to aggregate in at least one packet at the UE, its plurality of expressions into a single packet suitable for transmission in response to the generating of the plurality of expressions over a predetermined time period; and
   code for causing the at least one computer processor to direct transmission of the at least one packet to at least one of a plurality of relays, wherein the transmission of the single packet occurs after the expiration of the predetermined time period.

22. A computer program product, comprising:
   a non-transitory computer-readable medium associated with a user equipment (UE) for operation in a relay assisted peer discovery, comprising:
   code for causing at least one computer processor associated with the UE to direct transmission of a hashed expression at least to at least one relay associated with the UE for time varied hashing of, and broadcast of, the hashed expression by the at least one relay;
   code for causing the at least one computer processor to receive, at least from the at least one relay, a plurality of time varied hashed peer discovery expressions received from a plurality of second UEs; and
   code for causing the at least one processor to decrypt the received time varied hashed expressions to discern identities of ones of the plurality of second UEs.

23. The computer program product of claim 22, wherein the decryption is in accordance with the identities of the ones of the plurality of second UEs known to the UE.

24. The computer program product of claim 22, wherein said code for decrypting comprises code for causing the at least one processor to apply a hash public key.

25. The computer program product of claim 22, further comprising code for causing the at least one processor to initiate peer-to-peer communication with ones of the plurality of second UEs having known identities.

26. The computer program product of claim 22, wherein the hashed expression is a first time varied hashed expression.

27. The computer program product of claim 22, further comprising code for causing the at least one processor to direct an aggregating of the hashed expression in at least one packet at the first time and at at least one second time for transmitting.

28. A user equipment (UE) suitable for operating in relay assisted peer discovery, comprising:
   a transmitter configured to transmit a hashed expression of the UE, at a first time, at least to at least one relay communicatively associated with the UE for time varied hashing of, and broadcast of, the hashed expression by the at least one relay;
   a receiver configured to receive, at least from the at least one relay, of a plurality of second time varied hashed peer discovery expressions received from a plurality of second UEs; and
   an encrypting/decrypting module configured to decrypt the received second time varied hashed expressions to discern identities of ones of the plurality of second UEs.

29. The UE of claim 28, wherein said encrypting/decrypting module is configured to decrypt in accordance with the identities of the ones of the plurality of second UEs known to the UE.

30. The UE of claim 28, further comprising a peer-to-peer communication module configured to initiate peer-to-peer communication with ones of the plurality of second UEs having known identities.

31. The UE of claim 28, further comprising an active set determination module configured to elect a list of the identities of ones of the plurality of second UEs with which the UE wishes to communicate for transmission by said transmitter.

32. The UE of claim 28, wherein the hashed expression is a time varied hashed expression.

33. The UE of claim 28, wherein the hashed expression comprises at least one of a request for services, an offering of services, and a desire for peer-to-peer communication.

34. The UE of claim 28, wherein said encrypting/decrypting module is further configured to aggregate the hashed expression in at least one packet at the first time and at at least one second time for transmitting.

\* \* \* \* \*